(12) United States Patent
Naruse

(10) Patent No.: US 7,773,870 B2
(45) Date of Patent: Aug. 10, 2010

(54) IMAGE CAPTURE APPARATUS AND BIOMETRIC AUTHENTICATION APPARATUS

(75) Inventor: Tetsuya Naruse, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 764 days.

(21) Appl. No.: 11/704,955

(22) Filed: Feb. 12, 2007

(65) Prior Publication Data

US 2007/0196096 A1    Aug. 23, 2007

(30) Foreign Application Priority Data

Feb. 20, 2006    (JP) .............................. 2006-043030

(51) Int. Cl.
  G03B 39/00    (2006.01)
  G03B 17/02    (2006.01)
  G06T 1/00    (2006.01)
  G06F 3/041    (2006.01)
  G06K 9/00    (2006.01)
(52) U.S. Cl. ........................ 396/15; 396/535; 340/5.83; 345/173; 382/115; 382/124
(58) Field of Classification Search .................. 396/535, 396/15
  See application file for complete search history.

(56) References Cited

U.S. PATENT DOCUMENTS 4,924,085 A * 5/1990 Kato et al. ............. 250/227.28
7,599,613 B2 * 10/2009 Chang ........................ 396/15
2006/0247534 A1 11/2006 Sato ............................ 600/476

FOREIGN PATENT DOCUMENTS

| GB | 2400713 | 10/2004 |
| JP | 2005-152587 | 6/2005 |
| WO | WO-99/28701 | 6/1999 |
| WO | WO-02/15566 | 2/2002 |

OTHER PUBLICATIONS

European Patent Office Communication pursuant to Article 94(3) EPC dated Jan. 30, 2009 for corresponding European Application No. 07 102 730.4-2218.

* cited by examiner

Primary Examiner—Melissa J Koval
(74) Attorney, Agent, or Firm—Rader, Fishman & Grauer PLLC

(57) ABSTRACT

A biometric authentication apparatus includes an illumination section, an imaging section, a photographic subject placing section, and an authentication section. The illumination section irradiates at least near infrared light onto a biological portion placed in contact with a housing surface. The imaging section images a near infrared light image of the biological portion. The photographic subject placing section is provided in the vicinity of the illumination section, in which at least a part of the light emanation portion of the illumination section on a side where the imaging section is disposed is covered by the photographic subject when the photographic subject is placed. The authentication section performing biometric authentication by making a comparison between a specific pattern extracted from the near infrared light image of the biological portion imaged by the imaging section and a preliminarily registered specific pattern.

11 Claims, 16 Drawing Sheets

IMAGE CAPTURE APPARATUS AND BIOMETRIC AUTHENTICATION APPARATUS

CROSS REFERENCES TO RELATED APPLICATIONS

The present invention contains subject matter related to Japanese Patent Application JP 2006-043030 filed in the Japanese Patent Office on Feb. 20, 2006, the entire contents of which being incorporated herein by reference.

BACKGROUND OF THE INVENTION

1. Field of the Invention

The present invention relates to an image capture apparatus well suited for, for example, close-up photography for performing biometric authentication, such as vein authentication and fingerprint authentication, and for close-up photography performed to read, for example, OCR (optical character recognition) and QR (quick response) codes. In addition, the present invention relates to a biometric authentication apparatus for performing authentication of a specific user in accordance with a biological organism pattern of, for example, a vein photographed by the image capture apparatus.

2. Description of the Related Art

FIG. 32 is a view showing an example of a general layout of an image capturing camera and an illumination light disposed to a housing of a previously proposed imaging function-enabled mobile terminal (such as a camera-enabled mobile phone terminal, for example). In order to facilitate understanding of the arrangement of respective component elements, FIG. 32 depicts the state of the mobile phone terminal as partly perspectively viewed from the lateral side. FIG. 33 to be referenced below is similar to FIG. 33.

The mobile phone terminal shown in FIG. 32 is a camera-enabled mobile phone terminal in which a first housing 110a and a second housing 110b that are foldable via a rotary hinge member (not shown). The first housing 110a includes a display section 102 constituted of, for example, a liquid crystal display. The second housing 110b includes a keyboard section 103 having, for example, ten keys, and a battery section 104. The first housing 110a has two housing surfaces, i.e., major surfaces ("first and second major surfaces," hereinbelow) correlative to one another. The display section 102 is disposed on the first major surface, and a camera section 105 and a light section 106 are provided on the second major surface. The camera section 105 is configured from an image capture device and an imaging optical system. The light section 106 is configured from, for example, a LED (light emitting device) and an illumination optical system.

In the previously proposed mobile phone terminal shown in FIG. 32, the imaging optical system of the camera section 105 and the illumination optical system of the light section 106 are disposed such that the optical axes thereof are both substantially perpendicular to the second major surface of the first housing 110a. As such, during image capture by using the camera section 105, it is desirable that a photographic subject 109 is positioned apart at a focusable distance and substantially parallel to the first major surface of the first housing 110a in the imaging optical system.

Such positioning of the photographic subject 109 is effected not only in the normal image capture event, but also during image capture in the close-up photography. Of course, the positioning is similarly effected in the event that a photographic subject 109 is illuminated by the light section 106 and is captured by the camera section 105.

FIG. 33 is a view showing another example of a general layout of an image capturing camera and an illumination light disposed to a housing of a previously proposed imaging function-enabled mobile terminal (such as a camera-enabled mobile phone terminal). In FIG. 33, respective component elements having the same functions as those of the mobile phone terminal shown in FIG. 32 are designated by the same reference numerals, and descriptions thereof are omitted herefrom.

In the mobile phone terminal shown in FIG. 33, the camera section 105 and the light section 106 are on the side of the other housing surface (second major surface) correlated to the housing surface (first major surface) on which the keyboard section 103 is provided.

In the previously proposed mobile phone terminal shown in FIG. 33, the imaging optical system of the camera section 105 and the illumination optical system of the light section 106 are disposed such that the optical axes thereof are both substantially perpendicular to the second major surface of the first housing 110a. As such, similarly as in the mobile phone terminal shown in FIG. 32, during image capture by the camera section 105, it is desirable that a photographic subject 109 is apart at a focusable distance and substantially parallel to the first major surface of the first housing 110a in the imaging optical system.

Such positioning of the photographic subject 109 is effected not only in the normal image capture event, but also during image capture in the close-up photography. Of course, the positioning is similarly effected in the event that a photographic subject 109 is illuminated by the light section 106 and is captured by the camera section 105.

As an adapted example of close-up photography by a camera-enabled mobile phone terminal, Japanese Unexamined Patent Application Publication No. 2005-152587 (refer to FIGS. 1, 3, 7) discloses a mobile phone terminal. The terminal includes near infrared light source emitting with near infrared light and a CCD camera section having a filter transmitting near infrared light. The near infrared light is irradiated on a biological organism from the near infrared light source, and pattern light (blood vessel pattern light, for example) obtained via the interior of the biological organism is captured by the CCD camera section. Then, a blood vessel formation pattern obtained from an image signal of the pattern light of the specific tissue is compared with a preliminarily registered proper user (registered user). Thereby, authentication (so-called biometric authentication) is carried out to verify whether a terminal user of the terminal is the registered user.

SUMMARY OF THE INVENTION

Matters described herebelow have to be taken into account for performing close-up photography for, for example, biometric authentication and OCR by using the previously proposed image capture apparatus-equipped (enabled) mobile terminal described above.

Generally speaking, the depth of field in a camera lens system has a characteristic that it becomes smaller as the distance via a lens from an imaging surface to a photographic subject is smaller. As such, when performing, especially, close-up photography as described above, the distance from the lens to the photographic subject after focusing has to be maintained constant to prevent such a phenomenon in which the photographic subject is offset from the limit of depth of field to thereby cause the acquisition image to be blurred. The depth of field is increased proportionally as the f number of the optical system is increased. However, when the f number is increased, the amount of incident light is reduced, such that increase in the depth of field has to be limited to a certain level.

Further, generally, for image capture elements of cameras, an optimal range of amount of incident light is preliminarily determined. There are characteristics that in the event that the amount of incident light exceeds or becomes below the optimal range, a good imaged image cannot be obtained. In addition, in the event that, after the amount of emission light of a light source is determined, a photographic subject is illuminated by the light emanated from the light source, the illuminance on the photographic subject is varied depending on the distance from the light source to the photographic subject. As such, in such an event that the amount of emission light of a light source is determined to be a certain value and the photographic subject is imaged while being illuminated by the light emanated from the light source, image capture is preferably perform in the following manner. The variation of the distance from the light source to the photographic subject is reduced as much as possible, thereby to reduce illuminance variation on the photographic subject (that is, variation of amount of incident light on the image capture element).

As another point to be taken into account, so-called motion blur and photographic subject blur are, of course, reduced as much as possible.

However, as shown in FIGS. 32 and 33, in the previously proposed image capture apparatus-enabled mobile terminal, the portions among the respective the camera section 105, the light section 106, and the photographic subject 109 are formed only from spacings. As such, it is difficult to maintain the distances from the camera section 105 and the light section 106 to be constant and to prevent the motion blur, photographic subject blur, and the like.

In particular, in the close-up photography performed for the biometric authentication, when a clear photographic image cannot be acquired because of the occurrence of, for example, distance variation, motion blur, and/or photographic subject blur, authentication accuracy is reduced to the extent disabling intended or proper biometric authentication.

Further, in biometric authentication, comparison is made between photographic information (photographic information of finger veins, for example) of a specific biological portion preliminarily registered and photographic information of a biometrical portion imaged in a later authentication event. In the authentication, the registered biometrical portion and the same portion have to be accurately positionally matched.

Skill is required for accurate positional matching between biometrical portions (that is, position reproduction). For example, position reproduction in the biometric authentication event is difficult for, for example, a person who carries out an authentication operation for the first time, a person who seldom carries out the authentication operation, or a person who has a biometrical portion significantly differs in size and shape from a biometrical portion contemplated in the design stage. Further, since operability is reduced, the authentication accuracy is reduced.

The present invention is made in view of the circumstances such as described above. Accordingly, it would be desirable to provide an image capture apparatus that is capable of performing close-up photography without causing, for example, variation of the distance from, for example, a camera section or light section, motion blur, and photographic subject blur and that enables accuracy position reproduction of a specific biometrical portion for being imaged. Further, it would be desirable to provide a biometric authentication apparatus that is capable of accurately and easily performing authentication of a specific user in accordance with photographic information of the specific biometrical portion imaged by the aforementioned image capture apparatus.

According to one embodiment of the present invention, a mobile terminal includes an illumination section for illuminating a photographic subject placed in contact with a predetermined position of a housing surface; an imaging section for imaging the photographic subject placed in contact with the predetermined position of the housing surface, the imaging section being disposed in a portion apart from a disposition position of the illumination section; and a photographic subject placing section constituting a part of the housing surface and disposed in the vicinity of the illumination section, wherein a part of a light emanation portion of the illumination section is covered by the photographic subject when the photographic subject is placed in contact with the predetermined position.

According to another embodiment of the present invention, a biometric authentication apparatus includes an illumination section for irradiating at least near infrared light onto a biological portion placed in contact with a predetermined position of a housing surface; an imaging section for imaging at least a near infrared light image incoming from the biological portion placed in contact with the predetermined position of the housing surface, the imaging section being disposed in a portion apart from a disposition position of the illumination section; a photographic subject placing section constituting a part of the housing surface and disposed in the vicinity of the illumination section, wherein at least a part of the light emanation portion of the illumination section on a side where the imaging section is disposed is covered by the photographic subject when the photographic subject is placed in contact with the predetermined position; and an authentication section for performing biometric authentication by making a comparison between a specific pattern extracted from the near infrared light image of the biological portion imaged by the imaging section and a preliminarily registered specific pattern.

More specifically, according to the above-described, in the event of imaging a photographic subject, the photographic subject is situated in contact with the housing surface, such that, for example, variation of the distance variation of the distance from the imaging section or the illumination section, motion blur and photographic subject blur do not occur. Further, the image acquisition unit is disposed in the portion apart from the disposition position of the illumination section. As such, in an imaging event, a part of the light emanation portion of the illumination section is covered by the photographic subject. Consequently, substantially no cases take place in which illumination light directly enters into the imaging section or illumination light reflected off the surface of the photographic subject enters into the imaging section.

According to the above-described, in the event of imaging a photographic subject, the photographic subject is imaged in the manner that the photographic subject is placed in contact with the photographic subject placing section, and in that state, a part of the light emanation portion of the illumination section is covered by the photographic subject. Thereby, the close-up photography can be performed by suppressing variation of the distance from the imaging section or the illumination section to the photographic subject, motion blur, and the photographic subject blur. Further, in the event of performing biometric photography, accurate position reproduction of a specific biological portion being imaged can be performed. Consequently, authentication of a specific user can be accurately and easily performed.

BRIEF DESCRIPTION OF THE DRAWINGS

Embodiments of the present invention will be described in detail based on the following figures, wherein.

DESCRIPTION OF THE PREFERRED EMBODIMENTS

One embodiment of an image capture apparatus and biometric authentication apparatus will be described with reference to the accompanying drawings.

In the present embodiment, while a camera-enabled mobile phone terminal is contemplated as one embodiment of the image capture apparatus and biometric authentication apparatus, the present invention is not limited thereto in any way.

Layout Configuration of First Practical Example

Figure 1:
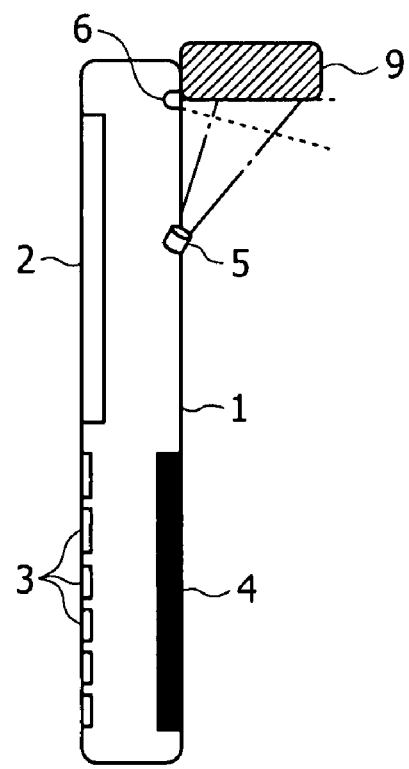
FIG. 1 is an explanatory view of a layout configuration of a first practical example of a mobile phone terminal in accordance with the embodiment of the present invention.

FIG. 1 shows a layout of a first practical example of an image capture apparatus or a camera section 5 and an illumination unit or a light section 6 that are disposed to a housing of a camera-enabled mobile phone terminal 1 in accordance with an embodiment of the present invention. In order to facilitate understanding of the arrangement of respective component elements, FIG. 1 depicts the state of the mobile phone terminal 1 as partly perspectively viewed from the lateral side. FIGS. 2 to 14, 16, 17, 19 to 24, 26, 27, 29, and 30 to be referenced below are similar to FIG. 1.

The mobile phone terminal 1 shown in FIG. 1 is of a so-called straight type ("straight camera-enabled mobile phone terminal 1," herebelow), of which major component elements includes, but not limited to, a display section 2 such as a liquid crystal display; a keyboard section 3; and a battery section 4. The mobile phone terminal 1 has two housing surfaces. Of the two housing surfaces, one housing surface where the display section 2 and the keyboard section 3 are mounted, hereinbelow, will be referred to as a "first major surface," and the other housing surface where the battery section 4 is provided, hereinbelow, will be referred to as a "second major surface." Further, the mobile phone terminal 1 shown in FIG. 1 has, on the side of the second major surface, the camera section 5 and the light section 6. The camera section 5 is configured to include an image capture device and an imaging optical system. The light section 106 is configured from, for example, a LED (light emitting device) and an illumination optical system.

In the layout of the first practical example, the mobile phone terminal 1 has two end portions correlative to one another, in which the battery section 4 is disposed in one end portion on the side of the second major surface of the terminal 1. The light section 6 is provided in the other end portion of the mobile phone terminal 1. The light section 6 is disposed therein such that the optical axis of the illumination optical system thereof is substantially perpendicular to the second major surface of the terminal 1. In more particular, in the case that the mobile phone terminal 1 of the present embodiment has a vein authentication function, the light section 6 is provided to include a light source capable of emanating or emitting near infrared light (rays).

The camera section 5 is provided between, for example, the light section 6 on the side of the second major surface of the mobile phone terminal 1 and the battery section 4. More specifically, the camera section 5 is disposed such that the optical axis of the imaging optical system thereof is directed to the vicinity upward of the disposition position of the light section 6. In more particular, in the case that the mobile phone terminal 1 of the present embodiment has the vein authentication function, the camera section 5 is provided to include a filter that transmits near infrared light. In the example of FIG. 1, while the camera section 5 partly projects from the second major surface, the camera section 5 can be of so-called retractable type to be storable into the housing.

The mobile phone terminal 1 is thus formed to have the layout configuration of the first practical example shown in FIG. 1. With the use of the mobile phone terminal 1, when performing, for example, close-up photography for biometric authentication such as vein authentication or fingerprint authentication, or close-up photography for reading, for example, OCR and QR codes, a photographic subject 9 (capture object) is placed in contact with a photographic subject placing section in a predetermined position which mounting section partly constitutes the second major surface of the mobile phone terminal 1. Concurrently, the photographic subject 9 is placed in such a manner as to partly cover an illumination light emanation portion of the light section 6.

In the layout configuration of the first practical example, the light emanated from the light section 6 never enters into the camera section 5 during close-up photography.

Figure 32:
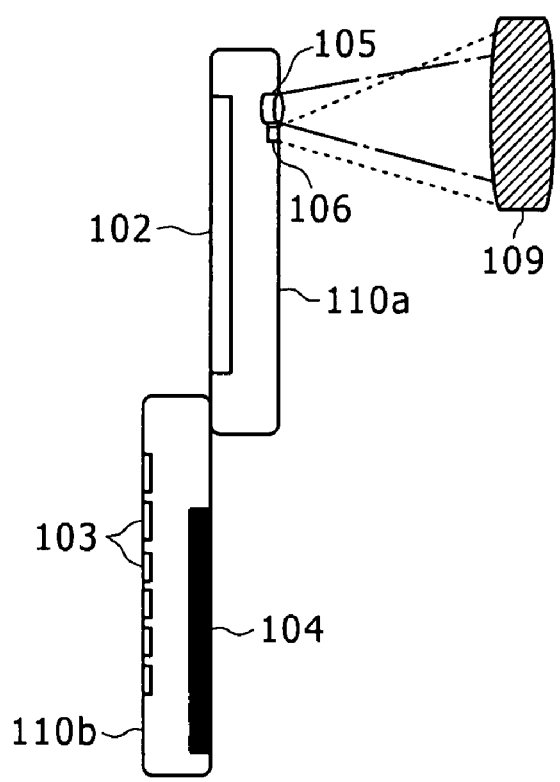
FIG. 32 is an explanatory view showing an example of a layout configuration of a previously proposed mobile phone terminal.
Figure 33:
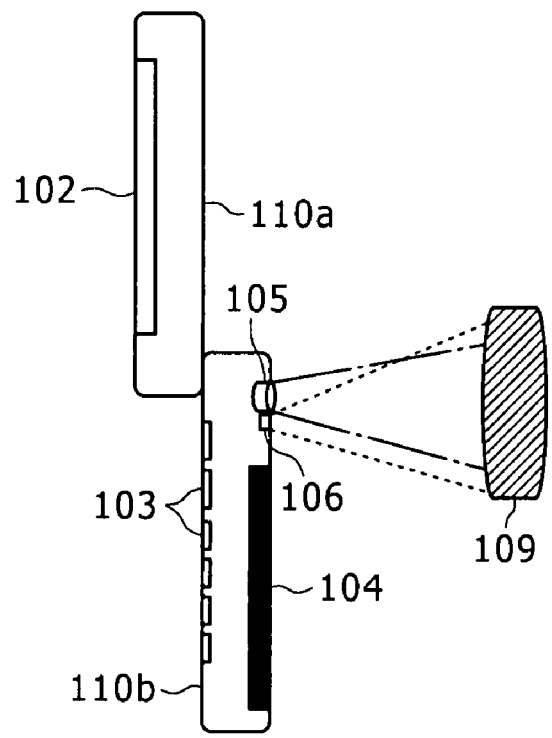
FIG. 33 is an explanatory view showing another example of a layout configuration of a previously proposed mobile phone terminal.

According to the layout configuration of the first practical example, when close-up photography is performed, the photographic subject 9 is never placed on substantially the front of the light section 6 and camera section 5 whose optical axes are directed in substantially the same direction as in the cases as shown in FIGS. 32 and 33. Consequently, different from the cases shown in FIGS. 32 and 33, no case occurs in which the light emanated from the light section 6 is reflected off the photographic subject 9 and then is led to directly enter into the camera section 5.

Further, according to the layout configuration of the first practical example, when close-up photography is performed, the photographic subject 9 is placed in contact with the first major surface of the mobile phone terminal 1. Consequently, such cases never occur in which the distances from the camera section 5 or the light section 6 to the photographic subject 9 vary, and relative positional blurring between the camera section 5 and the photographic subject 9 occurs.

Accordingly, according to the layout configuration of the first practical example, in, for example, close-up photography for biometric authentication such as vein authentication or fingerprint authentication, or close-up photography for reading, for example, OCR and QR codes, a good photographic image without defects resulted from, for example, motion blur and other blurs, can be acquired. Further, in photography of an image for biometric authentication, accurate position reproduction of a specific biometrical portion can be accomplished, therefore making it possible to accomplish accurate biometric authentication maintaining high authentication accuracy.

Layout Configuration of Second Practical Example

Figure 2:
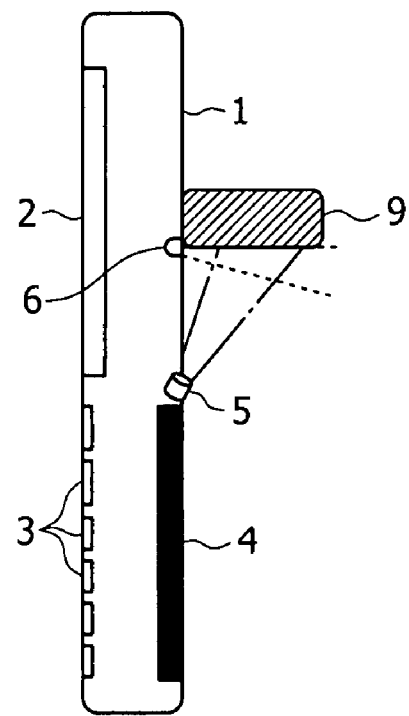
FIG. 2 is an explanatory view of a layout configuration of a second practical example of a mobile phone terminal in accordance with the embodiment of the present invention.

FIG. 2 shows a layout of the image capture apparatus or camera section 5 and the illumination unit or light section 6 that are disposed to a housing of a second practical example of a camera-enabled mobile phone terminal 1 in accordance with the embodiment of the present invention. In FIG. 2, respective component elements having the same functions as those in the mobile phone terminal 1 shown in FIG. 1 are shown with the same reference numerals, and repetitious descriptions thereof are omitted herefrom. FIGS. 3 to 14, 16, 17, 19 to 24, 26, 27, 29, and 30 to be referenced below are similar to FIG. 2.

According to the layout configuration of the second practical example shown in FIG. 2, the light section 6 is provided in a portion where the battery section 4 on the second major surface side is not provided, such as a portion in the vicinity of the central portion of the mobile phone terminal 1, for example. The light section 6 is disposed therein such that the optical axis of the illumination optical system thereof is substantially perpendicular to the second major surface of the mobile phone terminal 1.

The camera section 5 is provided, for example, in the vicinity of an end portion on the light section side of the battery section 4 on the second major surface side of the mobile phone terminal 1. The camera section 5 is disposed therein such that the optical axis of the imaging optical system thereof is directed to the vicinity upward of the disposition position of the light section 6.

The mobile phone terminal 1 is thus formed into the layout configuration of the second practical example shown in FIG. 2. With the use of the mobile phone terminal 1, when performing close-up photography similarly as in the first practical example, the photographic subject 9 (capture object) is placed in contact with the photographic subject placing section partly constituting the second major surface of the terminal 1. Concurrently, the photographic subject 9 is placed in such a manner as to partly cover the illumination light emanation portion of the light section 6.

According to the layout configuration of the second practical example, different from the cases shown in FIGS. 32 and 33, no case occurs in which the light emanated from the light section 6 is reflected off the photographic subject 9 and then is led to directly enter into the camera section 5. Further, such cases never occur in which the distances from the camera section 5 or the light section 6 to the photographic subject 9 vary, and relative positional blurring between the camera section 5 and the photographic subject 9 occurs.

Accordingly, according to the layout configuration of the second practical example, similarly as in the first practical example in close-up photography, a good photographic image without defects resulted from, for example, motion blur and other blurs, can be acquired. Further, in photography of an image for biometric authentication, accurate position reproduction of a specific biometrical portion can be accomplished, therefore making it possible to accomplish accurate biometric authentication maintaining high authentication accuracy.

Layout Configuration of Third Practical Example

Figure 3:
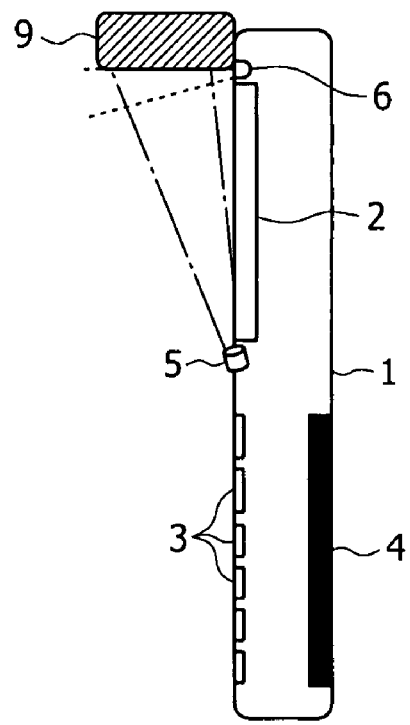
FIG. 3 is an explanatory view of a layout configuration of a third practical example of a mobile phone terminal in accordance with the embodiment of the present invention.

FIG. 3 shows a layout of the camera section 5 and light section 6 disposed to a housing of a third practical example of a camera-enabled mobile phone terminal 1 in accordance with the embodiment of the present invention.

In the layout configuration of the third practical example shown in FIG. 3, the light section 6 is provided in a terminal's end portion in the vicinity of the display section 2 on the first major surface side of the mobile phone terminal 1. The light section 6 is disposed therein such that the optical axis of the illumination optical system thereof is substantially perpendicular to the first major surface of the mobile phone terminal 1.

The camera section 5 is provided between, for example, the display section 2 and the keyboard section 3 on the first major surface side of the mobile phone terminal 1. The camera section 5 is disposed therein such that the optical axis of the imaging optical system thereof is directed to the vicinity upward of the disposition position of the light section 6.

The mobile phone terminal 1 is thus formed into the layout configuration of the third practical example shown in FIG. 3. With the use of the mobile phone terminal 1, when performing close-up photography similarly as in the respective first and second practical examples, the photographic subject 9 (capture object) is placed in contact with the photographic subject placing section partly constituting the first major surface of the mobile phone terminal 1. Concurrently, the photographic subject 9 is placed in such a manner as to partly cover the illumination light emanation portion of the light section 6.

According to the layout configuration of the third practical example, when close-up photography is carried out, effects similar to those in the respective first and second practical examples can be secured.

Layout Configuration of Fourth Practical Example

Figure 4:
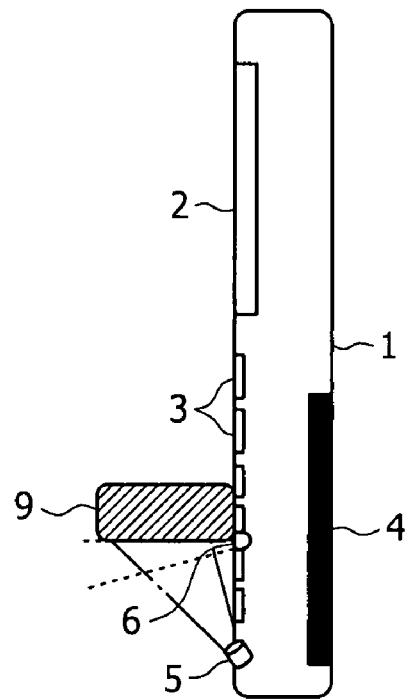
FIG. 4 is an explanatory view of a layout configuration a fourth practical example of a mobile phone terminal in accordance with the embodiment of the present invention.

FIG. 4 shows a layout of the camera section 5 and light section 6 disposed to a housing of a fourth practical example of a camera-enabled mobile phone terminal 1 in accordance with the embodiment of the present invention.

In the layout configuration of the fourth practical example shown in FIG. 4, the light section 6 is provided in an area of the keyboard section 3 on the first major surface side of the mobile phone terminal 1. The light section 6 is disposed therein such that the optical axis of the illumination optical system thereof is substantially perpendicular to the first major surface of the mobile phone terminal 1.

The camera section 5 is provided in the terminal end portion in the vicinity of the keyboard section 3 on the first major surface side of the mobile phone terminal 1. The camera section 5 is disposed therein such that the optical axis of the imaging optical system thereof is directed to the vicinity upward of the disposition position of the light section 6.

The mobile phone terminal 1 is thus formed into the layout configuration of the fourth practical example shown in FIG. 4. With the use of the mobile phone terminal 1, when performing close-up photography similarly as in the first and second practical examples, the photographic subject 9 (capture object) is placed in contact with the first major surface of the terminal 1. Concurrently, the photographic subject 9 is placed in such a manner as to partly cover the illumination light emanation portion of the light section 6.

According to the layout configuration of the fourth practical example, when close-up photography is carried out, effects similar to those in the respective first and second practical examples can be secured.

Layout Configuration of Fifth Practical Example

Figure 5:
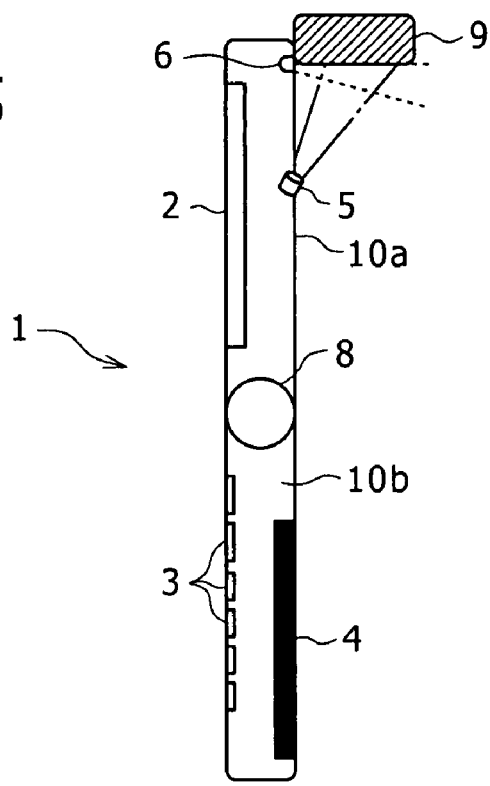
FIG. 5 is an explanatory view of a layout configuration of a fifth practical example of a mobile phone terminal in accordance with the embodiment of the present invention.

FIG. 5 shows a layout of the camera section 5 and light section 6 disposed to a housing of a fifth practical example of a camera-enabled mobile phone terminal 1 in accordance with the embodiment of the present invention.

The mobile phone terminal 1 shown in FIG. 5 is a camera-enabled mobile phone terminal that has a first and second housings 10a and 10b foldable via a rotary hinge member 8. The display section 2, the camera section 5, and the light section 6 are provided to the first housing 10a, and the keyboard section 3 and the battery section 4 are provided to the second housing 10b. In description herebelow, of housing surfaces of the first housing 10a, the surface on the side where the display section 2 is provided is referred to as a "first major surface," and the surface on the back surface side correlative to the first major surface is referred to as a "second major surface." Similarly, of housing surfaces of the second housing 10b, the surface on the side where the keyboard section 3 is provided is referred to as a "first major surface," and the surface on the side where the battery section 4 is provided is referred to as a "second major surface."

In the layout configuration of the fifth practical example shown in FIG. 5, the camera section 5 and the light section 6 are provided on the second major surface side of the first housing 10a.

The light section 6 is provided in the vicinity of the end portion of on the second major surface side of the first housing 10a on the side where the rotary hinge member 8 is not disposed. The light section 6 is disposed therein such that the optical axis of the illumination optical system thereof is substantially perpendicular to the second major surface of the first housing 10a.

The camera section 5 is provided in substantially the center of the second major surface of the first housing 10a. The camera section 5 is disposed therein such that the optical axis of the imaging optical system thereof is directed to the vicinity upward of the disposition position of the light section 6.

The mobile phone terminal 1 is thus formed into the layout configuration of the fifth practical example shown in FIG. 5. With the use of the mobile phone terminal 1, when performing close-up photography similarly as in the respective practical examples described above, the photographic subject 9 (capture object) is placed in contact with the photographic subject placing section partly constituting the second major surface of the first housing 10*a*. Concurrently, the photographic subject 9 is placed in such a manner as to partly cover the illumination light emanation portion of the light section 6.

According to the layout configuration of the fifth practical example, when close-up photography is carried out, effects similar to those in the respective practical examples described above can be secured.

Layout Configuration of Sixth Practical Example

Figure 6:
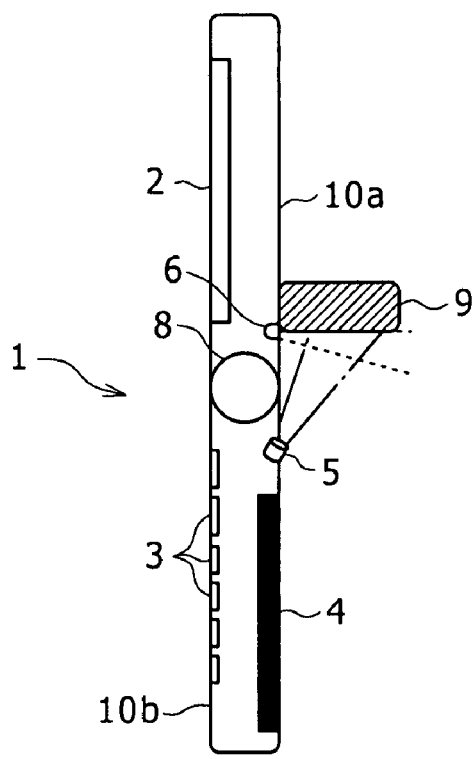
FIG. 6 is an explanatory view of a layout configuration of a sixth practical example of a mobile phone terminal in accordance with the embodiment of the present invention.

FIG. 6 shows a layout of the camera section 5 and light section 6 disposed to a housing unit of a sixth practical example of a camera-enabled mobile phone terminal 1 in accordance with the embodiment of the present invention.

In the layout configuration of the sixth practical example shown in FIG. 6, the light section 6 is provided on the second major surface side of the first housing 10*a*, and the camera section 5 is provided on the second major surface side of the second housing 10*b*.

The light section 6 is provided in the vicinity of the end portion on the second major surface side of the first housing 10*a* on the side where the rotary hinge member 8 is disposed. The light section 6 is disposed therein such that the optical axis of the illumination optical system thereof is substantially perpendicular to the second major surface of the first housing 10*a*.

The camera section 5 is provided in the vicinity of the end portion on the second major surface side of the second housing 10*b* on the side where the rotary hinge member 8 is disposed. The camera section 5 is disposed therein such that the optical axis of the imaging optical system thereof is directed to the vicinity upward of the disposition position of the light section 6 in an unfolded or open state (state of FIG. 6) of the mobile phone terminal 1.

The mobile phone terminal 1 is thus formed into the layout configuration of the sixth practical example shown in FIG. 6. With the use of the mobile phone terminal 1, when performing close-up photography similarly as in the respective practical examples described above, the photographic subject 9 (capture object) is placed in contact with the photographic subject placing section partly constituting the second major surface of the first housing 10*a*. Concurrently, the photographic subject 9 is placed in such a manner as to partly cover the illumination light emanation portion of the light section 6.

According to the layout configuration of the sixth practical example, when close-up photography is carried out, effects similar to those in the respective practical examples described above can be secured.

Layout Configuration of Seventh Practical Example

Figure 7:
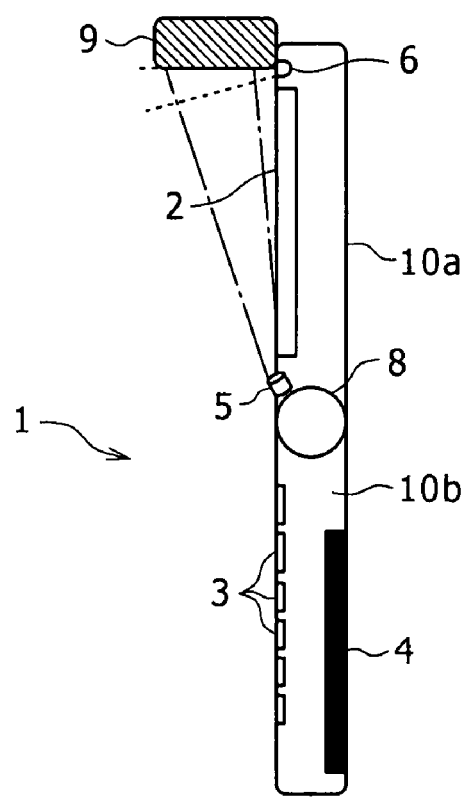
FIG. 7 is an explanatory view of a seventh practical example of a layout configuration of a mobile phone terminal in accordance with the embodiment of the present invention.

FIG. 7 shows a layout of the camera section 5 and light section 6 disposed to a housing unit of a seventh practical example of a foldable camera-enabled mobile phone terminal 1 in accordance with the embodiment of the present invention, which is similar to the respective one of those shown in FIGS. 5 and 6.

In the layout configuration of the seventh practical example shown in FIG. 7, the camera section 5 and the light section 6 are provided on the first major surface side of the first housing 10*a*.

The light section 6 is provided in the vicinity of the end portion on the first major surface side of the first housing 10*a* on the side where the rotary hinge member 8 is not disposed. The light section 6 is disposed therein such that the optical axis of the illumination optical system thereof is substantially perpendicular to the second major surface of the first housing 10*a*.

The camera section 5 is provided in the vicinity of the end portion on the first major surface side of the first housing 10*a* on the side where the rotary hinge member 8 is disposed. The camera section 5 is disposed therein such that the optical axis of the imaging optical system thereof is directed to the vicinity upward of the disposition position of the light section 6 in the open state (state of FIG. 7) of the mobile phone terminal 1.

The mobile phone terminal 1 is thus formed into the layout configuration of the seventh practical example shown in FIG. 7. With the use of the mobile phone terminal 1, when performing close-up photography similarly as in the respective practical examples described above, the photographic subject 9 (capture object) is placed in contact with the photographic subject placing section partly constituting the first major surface of the first housing 10*a*. Concurrently, the photographic subject 9 is placed in such a manner as to partly cover the illumination light emanation portion of the light section 6.

According to the layout configuration of the seventh practical example, when close-up photography is carried out, effects similar to those in the respective practical examples described above can be secured.

Layout Configuration of Eighth Practical Example

Figure 8:
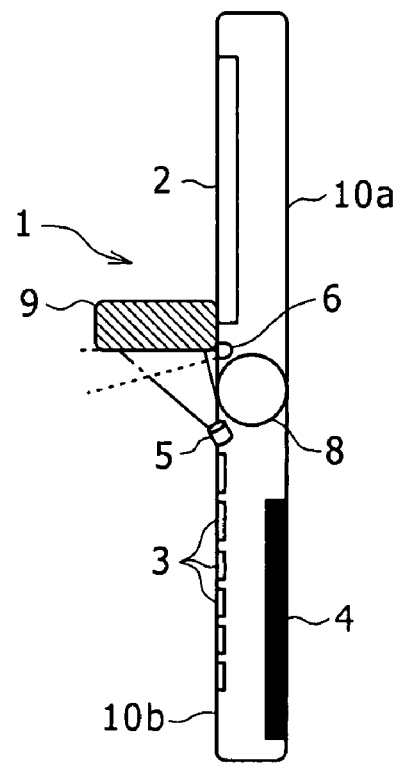
FIG. 8 is an explanatory view of a layout configuration of an eighth practical example of a mobile phone terminal in accordance with the embodiment of the present invention.

FIG. 8 shows a layout of the camera section 5 and light section 6 disposed to a housing unit of an eighth practical example of a foldable camera-enabled mobile phone terminal 1 in accordance with the embodiment of the present invention, which is similar to that described above.

In the layout configuration of the eighth practical example shown in FIG. 8, the light section 6 is provided on the first major surface side of the first housing 10*a*, and the camera section 5 is provided on the first major surface side of the second housing 10*b*.

The light section 6 is provided in the vicinity of the end portion on the first major surface side of the first housing 10*a* on the side where the rotary hinge member 8 is disposed. The light section 6 is disposed therein such that the optical axis of the illumination optical system thereof is substantially perpendicular to the first major surface of the first housing 10*a*.

The camera section 5 is provided in the vicinity of the end portion on the second major surface side of the second housing 10*b* on the side where the rotary hinge member 8 is disposed. The camera section 5 is disposed therein such that the optical axis of the imaging optical system thereof is directed to the vicinity upward of the disposition position of the light section 6 in the open state (state of FIG. 8) of the mobile phone terminal 1.

The mobile phone terminal 1 is thus formed into the layout configuration of the eighth practical example shown in FIG. 8. With the use of the mobile phone terminal 1, when performing close-up photography similarly as in the respective practical examples described above, the photographic subject 9 (capture object) is placed in contact with the photographic subject placing section partly constituting the second major surface of the first housing 10*a* of the mobile phone terminal 1 in the open state. Concurrently, the photographic subject 9 is placed in such a manner as to partly cover the illumination light emanation portion of the light section 6.

According to the layout configuration of the eighth practical example, when close-up photography is carried out, effects similar to those in the respective practical examples described above can be secured.

Layout Configuration of Eighth Practical Example

Figure 9:
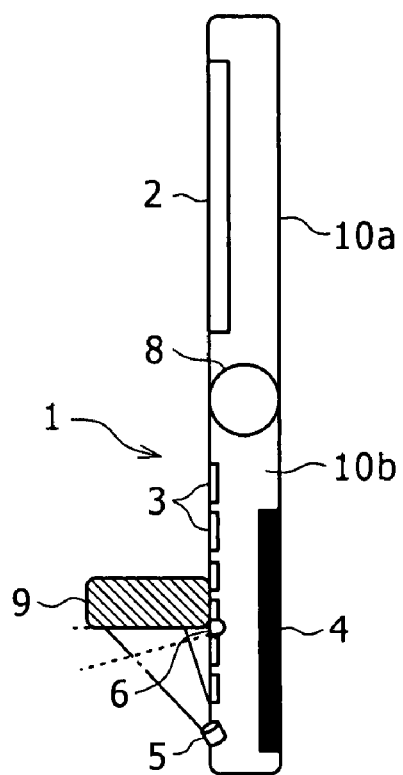
FIG. 9 is an explanatory view of a layout configuration of a ninth practical example of a mobile phone terminal in accordance with the embodiment of the present invention.

FIG. 9 shows a layout of the camera section 5 and light section 6 disposed to a housing unit of a ninth practical example of a foldable camera-enabled mobile phone terminal 1 in accordance with the embodiment of the present invention, which is similar to that described above.

In the layout configuration of the ninth practical example shown in FIG. 9, the light section 6 and the camera section 5 are both provided on the first major surface side of the second housing 10b.

The light section 6 is provided in an area of the keyboard section 3 on the first major surface of the second housing 10b. The light section 6 is disposed therein such that the optical axis of the illumination optical system thereof is substantially perpendicular to the first major surface of the second housing 10b.

The camera section 5 is provided in the vicinity of the end portion on the second major surface side of the second housing 10b on the side where the rotary hinge member 8 is not disposed. The camera section 5 is disposed therein such that the optical axis of the imaging optical system thereof is directed to the vicinity upward of the disposition position of the light section 6.

The mobile phone terminal 1 is thus formed into the layout configuration of the ninth practical example shown in FIG. 9. With the use of the mobile phone terminal 1, when performing close-up photography similarly as in the respective practical examples described above, the photographic subject 9 (capture object) is placed in contact with the photographic subject placing section partly constituting the first major surface of the second housing 10b of the mobile phone terminal 1 in the open state. Concurrently, the photographic subject 9 is placed in such a manner as to partly cover the illumination light emanation portion of the light section 6.

According to the layout configuration of the ninth practical example, when close-up photography is carried out, effects similar to those in the respective practical examples described above can be secured.

Layout Configuration of 10th Practical Example

Figure 10:
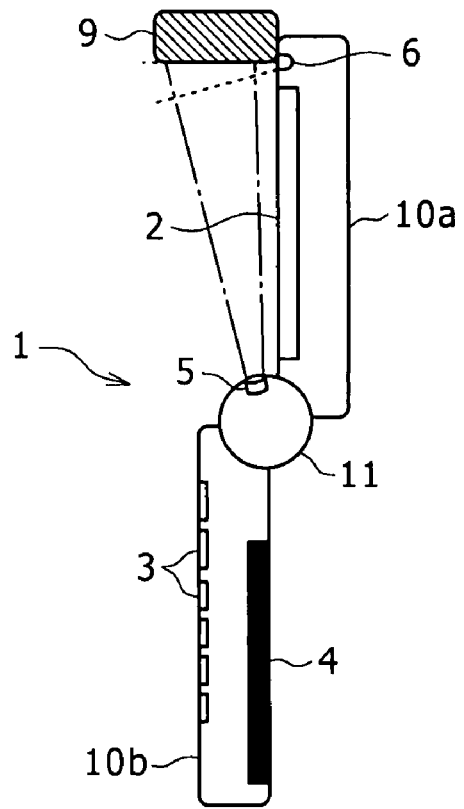
FIG. 10 is an explanatory view of a layout configuration of a 10th practical example of a mobile phone terminal in accordance with the embodiment of the present invention.

FIG. 10 shows a layout configuration of a 10th practical example of the camera section 5 and light section 6 disposed to a housing unit of a 10th practical example of a foldable camera-enabled mobile phone terminal 1 in accordance with the embodiment of the present invention. Shown in the drawing figure is different from the one of the above-described foldable type shown in each of FIGS. 5 to 9 in which the first and second housings 10a and 10b are substantially rectilinearly aligned in the open state. More specifically, in the mobile phone terminal 1 of FIG. 10, the camera section 5 and the light section 6 are disposed to the housing unit of the camera-enabled mobile phone terminal. In addition, a stepped portion is formed between the first and second housings 10a and 10b via a rotary hinge member 11 in the open state of the mobile phone terminal 1.

In the layout configuration of the 10th practical example shown in FIG. 10, the light section 6 is provided on the first major surface side of the first housing 10a, and the camera section 5 is provided inside the rotary hinge member 11.

The light section 6 is provided in the vicinity of an end portion on the first major surface side of the first housing 10a on the side where the rotary hinge member 11 is not disposed. The light section 6 is disposed therein such that the optical axis of the illumination optical system thereof is substantially perpendicular to the first major surface of the first housing 10a.

The camera section 5 is provided inside the rotary hinge member 11 such that the optical axis of the imaging optical system thereof is directed to the vicinity upward of the disposition position of the light section 6 in the open state (state of FIG. 10) of the mobile phone terminal 1.

The mobile phone terminal 1 is thus formed into the layout configuration of the 10th practical example shown in FIG. 10. With the use of the mobile phone terminal 1, when performing close-up photography similarly as in the respective practical examples described above, the photographic subject 9 (capture object) is placed in contact with the photographic subject placing section partly constituting the first major surface of the first housing 10a of the mobile phone terminal 1 in the open state. Concurrently, the photographic subject 9 is placed in such a manner as to partly cover the illumination light emanation portion of the light section 6.

According to the layout configuration of the 10th practical example, when close-up photography is carried out, effects similar to those in the respective practical examples described above can be secured. Further, as described above, in the 10th practical example, the stepped portion is formed between the first and second housings 10a and 10b via the rotary hinge member 11 in the open state of the mobile phone terminal 1, and the camera section 5 is provided inside the rotary hinge member 11. As such, the construction can be simplified since it does not have to be constructed in the manner that, as in the respective practical example described above, the camera section 5 is disposed to project from the major surface.

Layout Configuration of 11th Practical Example

Figure 11:
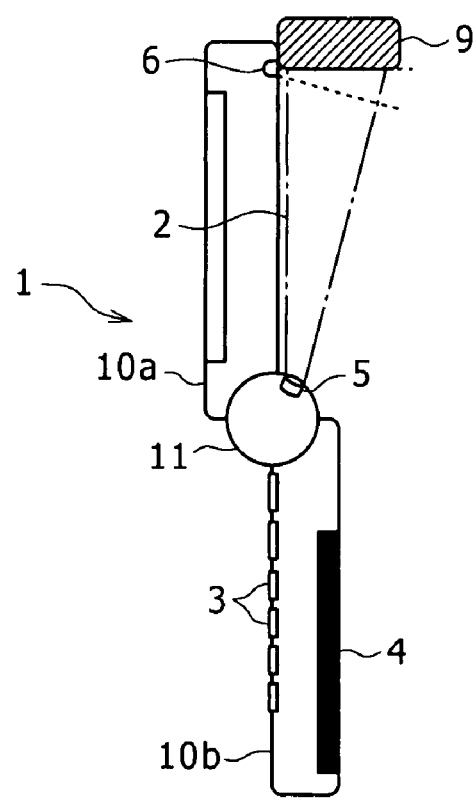
FIG. 11 is an explanatory view of a layout configuration of an 11th practical example of a mobile phone terminal in accordance with the embodiment of the present invention.

FIG. 11 shows a layout configuration of an 11th practical example of the camera section 5 and light section 6 disposed to a housing unit of a camera-enabled mobile phone terminal 1. Similarly as in the 10th practical example, the camera section 5 and the light section 6 are disposed to the housing unit of the camera-enabled mobile phone terminal in which a stepped portion is formed between the first and second housings 10a and 10b via the rotary hinge member 11 in the open state of the terminal 1.

In the layout configuration of the 11th practical example shown in FIG. 11, the light section 6 is provided on the second major surface side of the first housing 10a, and the camera section 5 is provided inside the rotary hinge member 11.

The light section 6 is provided in a portion in the vicinity of the end portion on the second major surface side of the first housing 10a on the side where the rotary hinge member 11 is not disposed. The light section 6 is disposed therein such that the optical axis of the illumination optical system thereof is substantially perpendicular to the second major surface of the first housing 10a.

The camera section 5 is provided inside the rotary hinge member 11 such that the optical axis of the imaging optical system thereof is directed to the vicinity upward of the disposition position of the light section 6 in the open state (state of FIG. 11) of the mobile phone terminal 1.

The mobile phone terminal 1 is thus formed into the layout configuration of the 11th practical example shown in FIG. 11. With the use of the mobile phone terminal 1, when performing close-up photography similarly as in the respective practical examples described above, the photographic subject 9 (capture object) is placed in contact with the photographic subject placing section included in the second major surface of the first housing 10a of the mobile phone terminal 1 in the open state. Concurrently, the photographic subject 9 is placed in such a manner as to partly cover the illumination light emanation portion of the light section 6.

According to the layout configuration of the 11th practical example, when close-up photography is carried out, effects similar to those in the respective practical examples described above can be secured. In particular, similar effects in construction as in the 10th practical example can be secured.

Layout Configuration of 12th Practical Example

Figure 12:
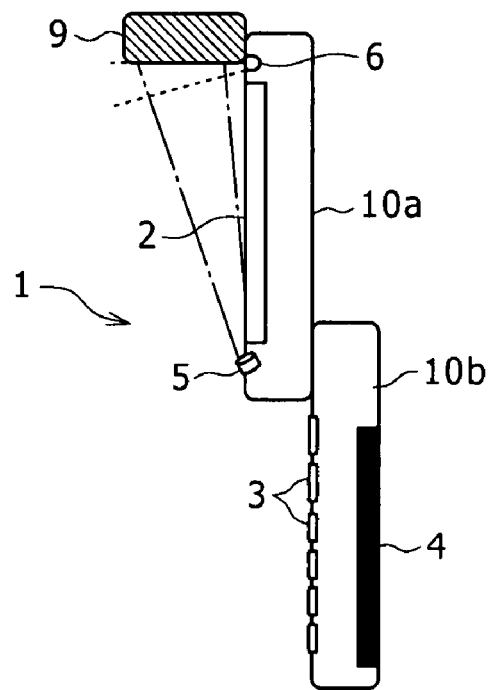
FIG. 12 is an explanatory view of a layout configuration of a 12th practical example of a mobile phone terminal in accordance with the embodiment of the present invention.

FIG. 12 shows a layout configuration of the camera section 5 and light section 6 disposed to a housing unit of a 12th practical example of a camera-enabled mobile phone terminal 1. The mobile phone terminal 1 is of a so-called slide type (the terminal hereinbelow will alternatively referred to as a "slidable camera-enabled mobile phone terminal," herebelow) in which the first and second housings 10a and 10b are slidable on their major surfaces relatively to one another.

In the layout configuration of the 12th practical example shown in FIG. 12, the light section 6 and the camera section 5 are both provided on the first major surface side of the first housing 10a.

The light section 6 is provided in the vicinity of the end portion on the first major surface side of the first housing 10a on the side not in contact with the second housing 10b in the open state (state of FIG. 12) of the mobile phone terminal 1. The light section 6 is disposed therein such that the optical axis of the illumination optical system thereof is substantially perpendicular to the first major surface of the first housing 10a.

The camera section 5 is provided in the vicinity of the end portion on the first major surface side of the first housing 10a on the side in contact with the second housing 10b in the open state (state of FIG. 12) of the mobile phone terminal 1. The camera section 5 is provided therein such that the optical axis of the imaging optical system thereof is directed to the vicinity upward of the disposition position of the light section 6 in the open state (state of FIG. 12) of the mobile phone terminal 1.

The mobile phone terminal 1 is thus formed into the layout configuration of the 12th practical example shown in FIG. 12. With the use of the mobile phone terminal 1, when performing close-up photography similarly as in the respective practical examples described above, the photographic subject 9 (capture object) is placed in contact with the photographic subject placing section included in the first major surface of the first housing 10a. Concurrently, the photographic subject 9 is placed in such a manner as to partly cover the illumination light emanation portion of the light section 6.

According to the layout configuration of the 12th practical example, when close-up photography is carried out, effects similar to those in the respective practical examples described above can be secured.

Layout Configuration of 13th Practical Example

Figure 13:
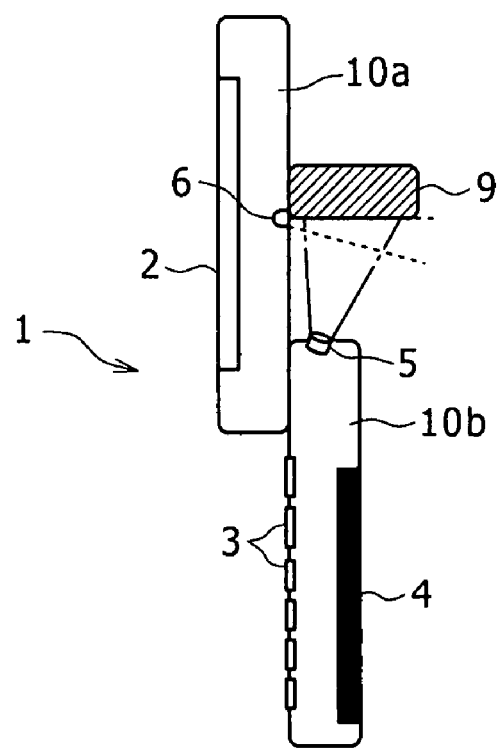
FIG. 13 is an explanatory view of a 13th practical example of a layout configuration of a mobile phone terminal in accordance with the embodiment of the present invention.

FIG. 13 shows a layout configuration of the camera section 5 and light section 6 disposed to a housing unit of a 13th practical example of a slidable camera-enabled mobile phone terminal 1 similar to the example of FIG. 12.

In the layout configuration of the 13th practical example shown in FIG. 13, the light section 6 is provided to the first housing 10a, and the camera section 5 is provided to the second housing 10b.

The light section 6 is provided in, for example, a central portion on the second major surface side of the first housing 10a, in which the central portion exposed to the outside in the open state (state of FIG. 13) of the mobile phone terminal 1. The light section 6 is disposed therein such that the optical axis of the illumination optical system thereof is substantially perpendicular to the second major surface of the first housing 10a.

The camera section 5 is provided to a lateral surface of the end portion of the second housing 10b on the side in contact with the first housing 10a. The camera section 5 is provided therein such that the optical axis of the imaging optical system thereof is directed to the vicinity upward of the disposition position of the light section 6 in the open state of the mobile phone terminal 1.

The mobile phone terminal 1 is thus formed into the layout configuration of the 13th practical example shown in FIG. 13. With the use of the mobile phone terminal 1, when performing close-up photography similarly as in the respective practical examples described above, the photographic subject 9 (capture object) is placed in contact with the photographic subject placing section included in the second major surface of the first housing 10a. Concurrently, the photographic subject 9 is placed in such a manner as to partly cover the illumination light emanation portion of the light section 6.

According to the layout configuration of the 13th practical example, when close-up photography is carried out, effects similar to those in the respective practical examples described above can be secured. Further, similarly as shown in FIG. 10, in the 13th practical example, the stepped portion is formed between the first and second housings 10a and 10b in the open state of the mobile phone terminal 1, and the camera section 5 is provided to the lateral surface of the end portion of the second housing 10b. As such, the construction can be simplified since it does not have to be constructed in the manner that, as in the respective practical example described earlier, the camera section 5 is disposed to project from the major surface.

Layout Configuration of 14th Practical Example

Figure 14:
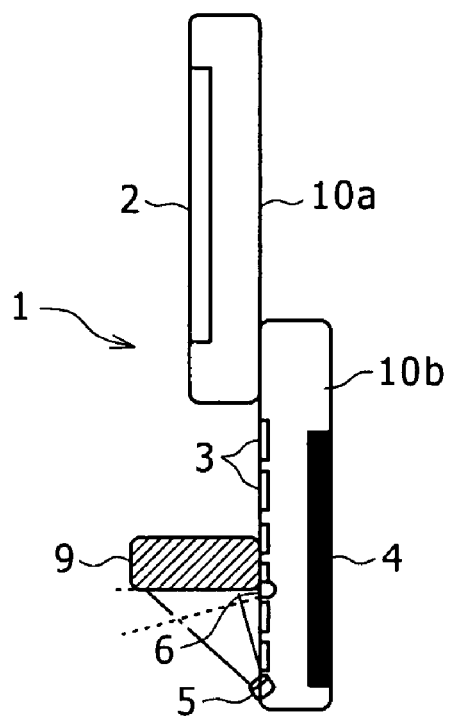
FIG. 14 is an explanatory view of a layout configuration of a 14th practical example of a mobile phone terminal in accordance with the embodiment of the present invention.

FIG. 14 shows a layout configuration of the camera section 5 and light section 6 disposed to a housing unit of a 14th practical example of a slidable camera-enabled mobile phone terminal 1 similar to the example described above.

In the layout configuration of the 14th practical example shown in FIG. 14, the light section 6 and the camera section 5 are both provided on the first major surface side of the second housing 10b.

In the layout configuration of the 14th practical example shown in FIG. 14, the light section 6 is provided in the area of the keyboard section 3 on the first major surface of the second housing 10b. The light section 6 is disposed therein such that the optical axis of the illumination optical system thereof is substantially perpendicular to the first major surface of the second housing 10b.

The camera section 5 is provided in the vicinity of the end portion on the first major surface side of the second housing 10b on the side not in contact with the first housing 10a in the open state (state of FIG. 14) of the mobile phone terminal 1. The camera section 5 is provided therein such that the optical axis of the imaging optical system thereof is directed to the vicinity upward of the disposition position of the light section 6 in the open state of the mobile phone terminal 1.

The mobile phone terminal 1 is thus formed into the layout configuration of the 14th practical example shown in FIG. 14. With the use of the mobile phone terminal 1, when performing close-up photography similarly as in the respective practical examples described above, the photographic subject 9 (capture object) is placed in contact with the photographic subject placing section included in the first major surface of the second housing 10b. Concurrently, the photographic subject 9 is placed in such a manner as to partly cover the illumination light emanation portion of the light section 6.

According to the layout configuration of the 14th practical example, when close-up photography is carried out, effects similar to those in the respective practical examples described above can be secured.

First Utilization Example in Biometric Authentication

Figure 15:
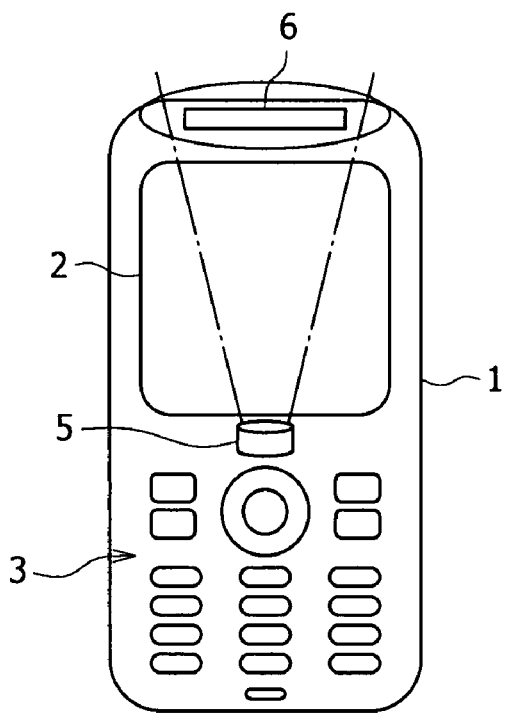
FIG. 15 is a schematic front view of a mobile phone terminal in a first utilization example in the case of performing finger vein authentication in accordance with the embodiment of the present invention.
Figure 16:
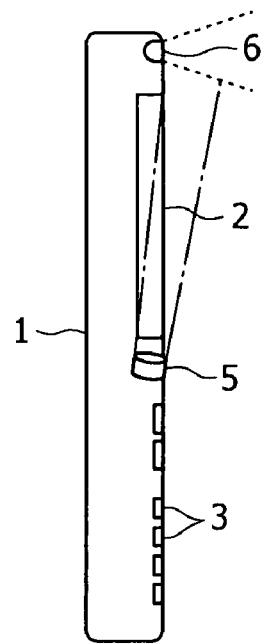
FIG. 16 is a schematic left side view of the mobile phone terminal in the first utilization example in the case of performing finger vein authentication in accordance with the embodiment of the present invention.
Figure 17:
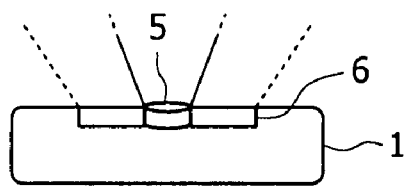
FIG. 17 is a schematic bottom view of the mobile phone terminal in the first utilization example in the case of performing finger vein authentication in accordance with the embodiment of the present invention.

FIGS. 15 to 17 show a practical utilization example (first utilization example) in the case of performing, for example, finger vein authentication by using the straight camera-enabled mobile phone terminal 1 shown in FIG. 3. FIG. 15 is a view of the straight mobile phone terminal 1 as viewed from the first major surface. FIG. 16 is a view of the mobile phone terminal 1 as viewed from the left lateral side. FIG. 17 is a view of the mobile phone terminal 1 of FIG. 15, as viewed from the lower face side.

In the mobile phone terminal 1 of the present embodiment inclusive of the function of finger vein authentication, the illumination light emanation portion of the light section 6 is in the shape of, for example, a rectangle with long sides situated on the minor axis side of the terminal 1. More specifically, the illumination light emanation portion is in the shape of a rectangle with long sides are situated along the direction substantially perpendicular to the optical axis direction of the camera section 5. Further, as described in conjunction with the third practical example, the camera section 5 is provided between the display section 2 and the keyboard section 3 in the manner that the optical axis of the imaging optical system thereof is directed to the vicinity upward of the disposition position of the light section 6.

In finger vein authentication with the use of the mobile phone terminal 1, for example, two adjacent fingers 20a and 20b of the right hand of a user are placed in such a manner as to sandwich or to hold the mobile phone terminal 1 therebetween. Thereby, as shown in FIGS. 18 to 20, the user's finger 20a is placed in contact with the first major surface of the mobile phone terminal 1 and in such a manner as to cover the camera section 5 side of the illumination light emanation portion.

Figure 18:
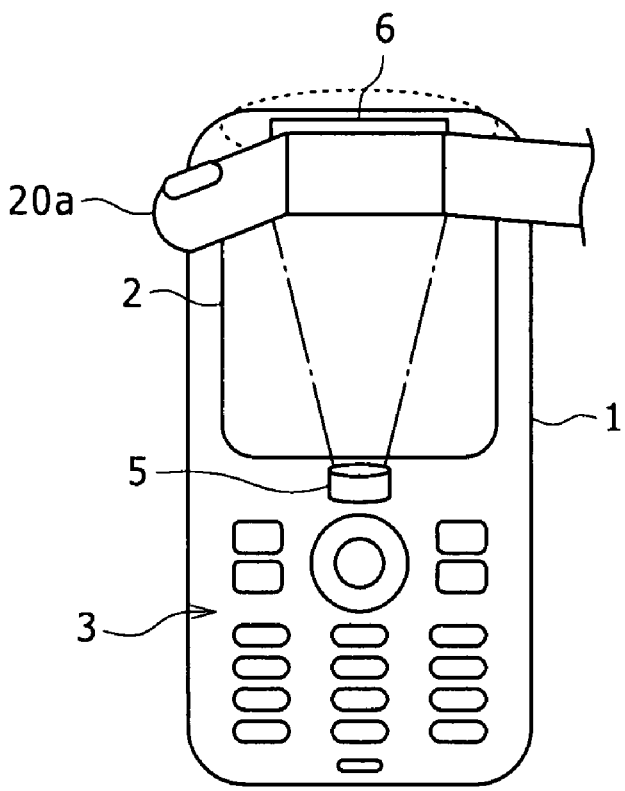
FIG. 18 is a schematic front view of the mobile phone terminal during finger vein authentication of the right hand of a user in the first utilization example.
Figure 19:
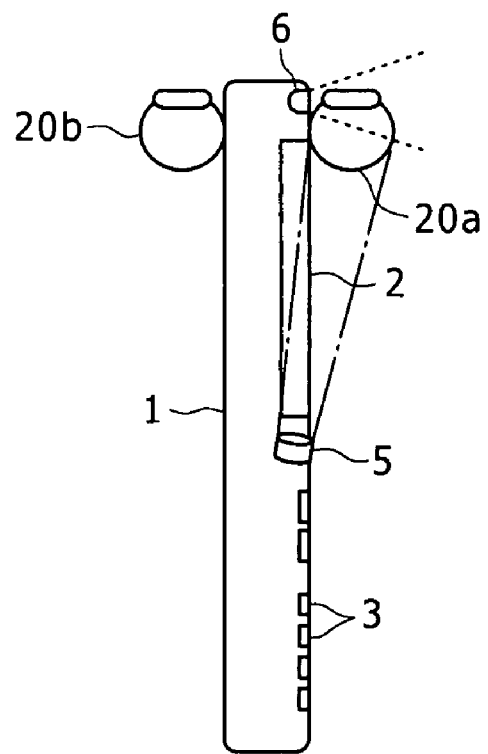
FIG. 19 is a schematic left side view of the mobile phone terminal during finger vein authentication of the right hand of the user in the first utilization example.
Figure 20:
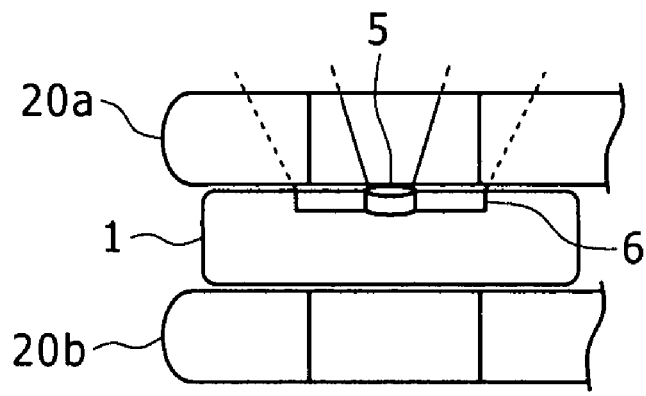
FIG. 20 is a schematic bottom view of the mobile phone terminal during finger vein authentication of the right hand of the user in the first utilization example.

Description will be further made herebelow by additionally referring to FIGS. 18 to 20. FIG. 18 is a view of the mobile phone terminal 1 during finger vein authentication of a user's right hand finger 20a, as viewed from the first major surface side. FIG. 19 is a view of the mobile phone terminal 1 during the finger vein authentication shown in FIG. 1, as viewed from the left lateral side. FIG. 20 is a view of the mobile phone terminal 1 during the finger vein authentication shown in FIG. 1, as viewed from the lower face side.

The mobile phone terminal 1 of the present embodiment is thus configured to include the vein authentication function, as described above. In this configuration, the camera section 5 is disposed such that the optical axis thereof is directed diagonally with respect to the first major surface and upwardly of the disposition position of the light section 6. As such, when imaging the photographic subject (that is, the finger 20a) by using the camera section 5, the finger 20a is inevitably placed in close proximity to (or in contact with) with the housing. Thereby, the positional relationship between the housing and the photographic subject (finger 20a) can easily be established, such that steady photography can be implemented. Further, in the utilization example, the mobile phone terminal 1 is clamped between the fingers 20a and 20b, and the lateral portion of the mobile phone terminal 1 is held abut on a base (palm) side of the fingers 20a and 20b. In this case, relative position variation between the fingers and the mobile phone terminal 1 is reduced to be very small. In addition, the biological portion of which a vain image is to be imaged is not an end portion of the finger, but is a middle portion of the finger that is easy to be used for the vein authentication. Further, according to the present embodiment, since the photographic subject (finger 20a) is steadily placed to the photographic subject placing section, also illumination onto the photographic subject is situated in an optimal position. Thereby, the relative positional relationship between the photographic subject and the illumination is relatively steady, and, for example, the brightness of the illumination and various setting parameters can be relatively easily determined.

Further, according to the mobile phone terminal 1 of the present embodiment, the photographic subject or finger 20a is placed in contact with the first major surface of the terminal 1 and in such a manner as to cover the camera section 5 side of the illumination light emanation portion of the light section 6. Consequently, a good vain image can be captured or acquired by the camera section 5. More specifically, in the case of performing vein authentication, an image of a photographic subject or in-vivo vain has to be acquired. As such, for example, in cases where, for example, the illumination light directly enters into the camera section 5, or illumination light reflected off the surface of the biological portion enters into the camera section 5, a good vain image cannot be acquired. However, as described above, according to the mobile phone terminal 1 of the present embodiment, the finger 20a (photographic subject) is placed in contact with the photographic subject placing section and in such a manner as to cover the camera section 5 side of the illumination light emanation portion of the housing surface. As such, no cases occur where, for example, the illumination light of the light section 6 enters into the camera section 5 or the reflected light from the surface of the finger 20a (photographic subject) enters into the camera section 5. Consequently, a good vain image can be acquired. In the present embodiment, the optical axis of the imaging optical system of the camera section 5 is directed perpendicular to the photographic subject placed on the housing surface, such that the influence of outer light such as sun light, for example, is reduced.

Although not shown, elements other than those described above are provided in the mobile phone terminal 1 of the present embodiment. For example, an indicator and a concave or convex portion for indicating the placement position (photographic subject placing section) of the photographic subject (finger 20a) are provided on the housing unit. Thereby, steady photographic subject positioning, that is, reproducibility of the photographic subject placement position can be improved.

Although not shown, concave or convex portions matching with the finger shapes can be provided in the portion (photographic subject placing section) that is clamped between by the fingers 20a and 20b.

Second Utilization Example in Biometric Authentication

Figure 21:
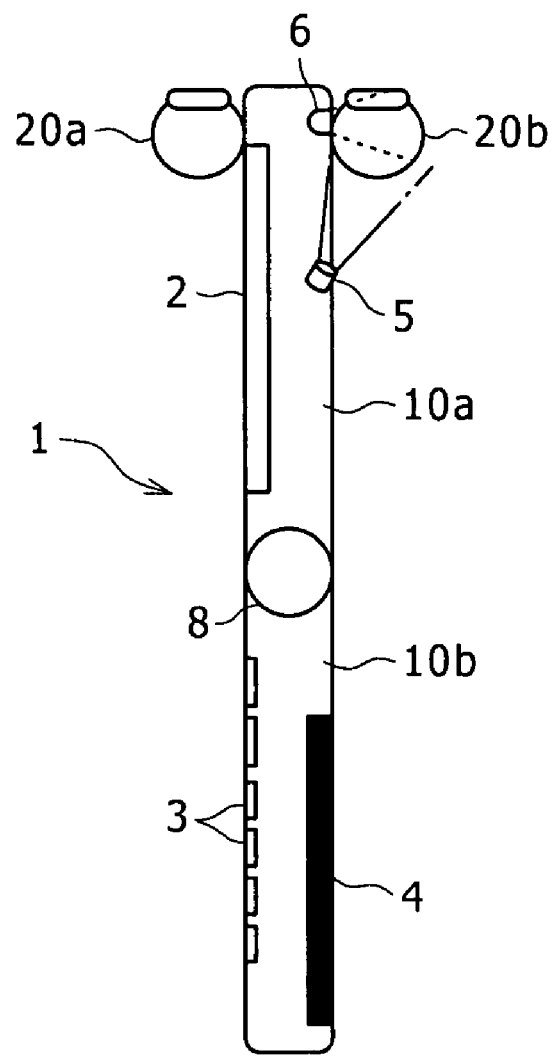
FIG. 21 is an explanatory schematic bottom view of the mobile phone terminal in a second utilization example in the case of performing finger vein authentication in accordance with the embodiment of the present invention.

FIG. 21 shows a practical utilization example (second utilization example) in the case of performing, for example, finger vein authentication by using the foldable mobile phone terminal 1 shown in FIG. 5.

In the mobile phone terminal 1 shown in FIG. 21, similarly as in the example shown in FIG. 5, the camera section 5 and the light section 6 are both provided on the second major surface side of the first housing 10a. Similarly as in the first utilization example, the illumination light emanation portion of the light section 6 is in the shape of a rectangle. As described in conjunction with the fifth practical example, the camera section 5 is provided in substantially the center of the second major surface of the first housing 10a in the manner that the optical axis of the imaging optical system thereof is directed to the vicinity upward of the disposition position of the light section 6.

In finger vein authentication with the use of the mobile phone terminal 1 of the third utilization example, for example, two adjacent fingers 20a and 20b of the left hand of a user are placed in such a manner as to hold the mobile phone terminal 1 therebetween. Thereby, as shown in FIG. 21, the user's finger 20b is placed in contact with the second major surface of the mobile phone terminal 1 and in such a manner as to cover the camera section 5 side of the illumination light emanation portion. Thereby, the positional relationship between the housing and the photographic subject (finger 20b) can easily be established, such that steady photography can be implemented. Consequently, also in the mobile phone terminal 1 of the second utilization example, effects similar to those in the first utilization example can be secured.

Third Utilization Example in Biometric Authentication

Figure 22:
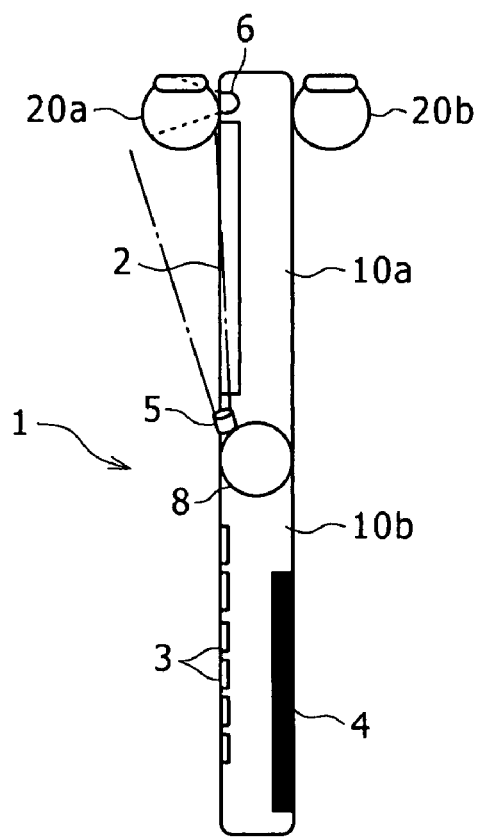
FIG. 22 is an explanatory schematic bottom view of the mobile phone terminal in a third utilization example in the case of performing finger vein authentication in accordance with the embodiment of the present invention.

FIG. 22 shows a practical utilization example (third utilization example) in the case of performing, for example, finger vein authentication by using the foldable mobile phone terminal 1 shown in FIG. 7.

In the mobile phone terminal 1 shown in FIG. 22, similarly as in the example shown in FIG. 7, the camera section 5 and the light section 6 are both provided on the first major surface side of the first housing 10a. Similarly as in the first utilization example, the illumination light emanation portion of the light section 6 is in the shape of a rectangle. As described in conjunction with the seventh practical example, the camera section 5 is provided in the vicinity of the end portion on the first major surface side on the side where the rotary hinge member 8 is disposed. The camera section 5 is disposed therein in the manner that the optical axis of the imaging optical system thereof is directed to the vicinity upward of the disposition position of the light section 6.

In finger vein authentication with the use of the mobile phone terminal 1 of the third utilization example, for example, two adjacent fingers 20a and 20b of the left hand of a user are placed in such a manner as to hold the mobile phone terminal 1 therebetween. Thereby, as shown in FIG. 22, the user's finger 20a is placed in contact with the first major surface of the mobile phone terminal 1 and in such a manner as to cover the camera section 5 side of the illumination light emanation portion. Thereby, the positional relationship between the housing and the photographic subject (finger 20a) can easily be established, such that steady photography can be implemented. Consequently, also in the mobile phone terminal 1 of the third utilization example, effects similar to those in the respective first and second utilization examples can be secured.

Fourth Utilization Example in Biometric Authentication

Figure 23:
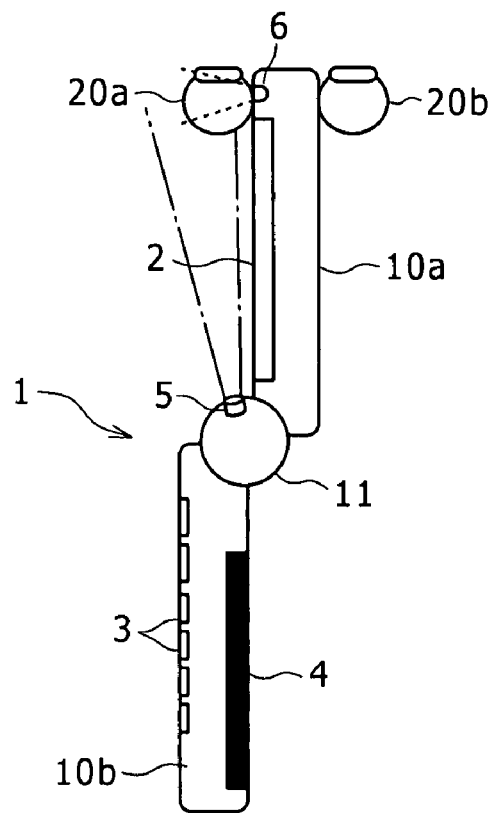
FIG. 23 is an explanatory schematic bottom view of the mobile phone terminal in a fourth utilization example in the case of performing finger vein authentication in accordance with the embodiment of the present invention.

FIG. 23 shows a practical utilization example (fourth utilization example) in the case of performing, for example, finger vein authentication by using the foldable mobile phone terminal 1 shown in FIG. 10.

In the mobile phone terminal 1 shown in FIG. 23, similarly as in the example shown in FIG. 10, the light section 6 is provided on the first major surface side of the first housing 10a. Similarly as in the first utilization example, the illumination light emanation portion of the light section 6 is in the shape of a rectangle. As described in conjunction with the 10th practical example, the camera section 5 is provided to the rotary hinge member 11. The camera section 5 is disposed therein in the manner that the optical axis of the imaging optical system thereof is directed to the vicinity upward of the disposition position of the light section 6.

In finger vein authentication with the use of the mobile phone terminal 1 of the fourth utilization example, for example, two adjacent fingers 20a and 20b of the left hand of a user are placed in such a manner as to hold the mobile phone terminal 1 therebetween. Thereby, as shown in FIG. 23, the user's finger 20a is placed in contact with the first major surface of the mobile phone terminal 1 and in such a manner as to cover the camera section 5 side of the illumination light emanation portion. Thereby, the positional relationship between the housing and the photographic subject (finger 20a) can easily be established, such that steady photography can be implemented. Consequently, also in the mobile phone terminal 1 of the fourth utilization example, effects similar to those in the respective utilization examples described above can be secured.

Fifth Utilization Example in Biometric Authentication

Figure 24:
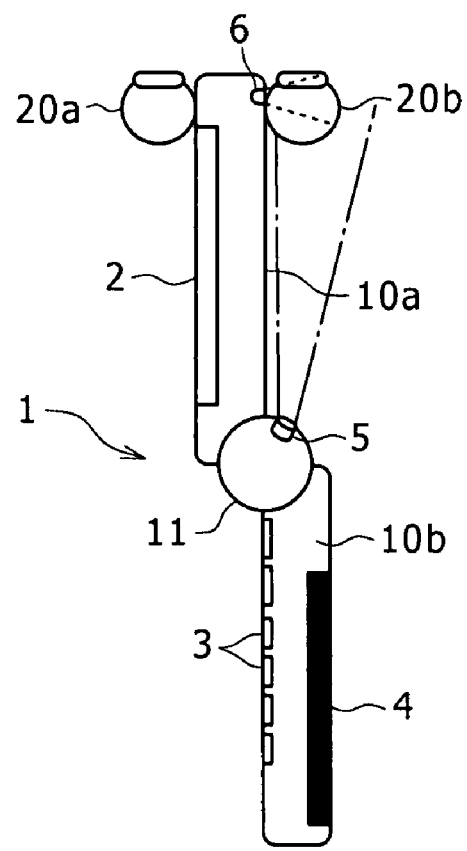
FIG. 24 is an explanatory schematic bottom view of the mobile phone terminal in a fifth utilization example in the case of performing finger vein authentication in accordance with the embodiment of the present invention.

FIG. 24 shows a practical utilization example (fifth utilization example) in the case of performing, for example, finger vein authentication by using the foldable mobile phone terminal 1 shown in FIG. 11.

In the mobile phone terminal 1 shown in FIG. 24, similarly as in the example shown in FIG. 11, the light section 6 is provided on the second major surface side of the first housing 10a. Similarly as in the first utilization example, the illumination light emanation portion of the light section 6 is in the shape of a rectangle. As described in conjunction with the 11th practical example, the camera section 5 is provided to the rotary hinge member 11. The camera section 5 is disposed therein in the manner that the optical axis of the imaging optical system thereof is directed to the vicinity upward of the disposition position of the light section 6.

In finger vein authentication with the use of the mobile phone terminal 1 of the fifth utilization example, for example, two adjacent fingers 20a and 20b of the left hand of a user are placed in such a manner as to hold the mobile phone terminal 1 therebetween. Thereby, as shown in FIG. 24, the user's finger 20a is placed in contact with the first major surface of the mobile phone terminal 1 and in such a manner as to cover the camera section 5 side of the illumination light emanation portion. Thereby, the positional relationship between the housing and the photographic subject (finger 20a) can easily be established, such that steady photography can be implemented. Consequently, also in the mobile phone terminal 1 of the fifth utilization example, effects similar to those in the respective utilization examples described above can be secured.

Layout Configuration of 15th Practical Example

Figure 25:
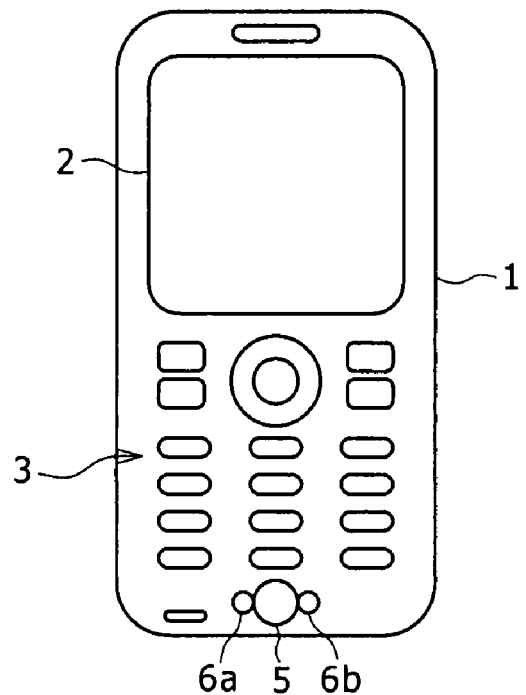
FIG. 25 is a schematic front view of a layout configuration of a 15th practical example of a mobile phone terminal in accordance with the embodiment of the present invention.
Figure 26:
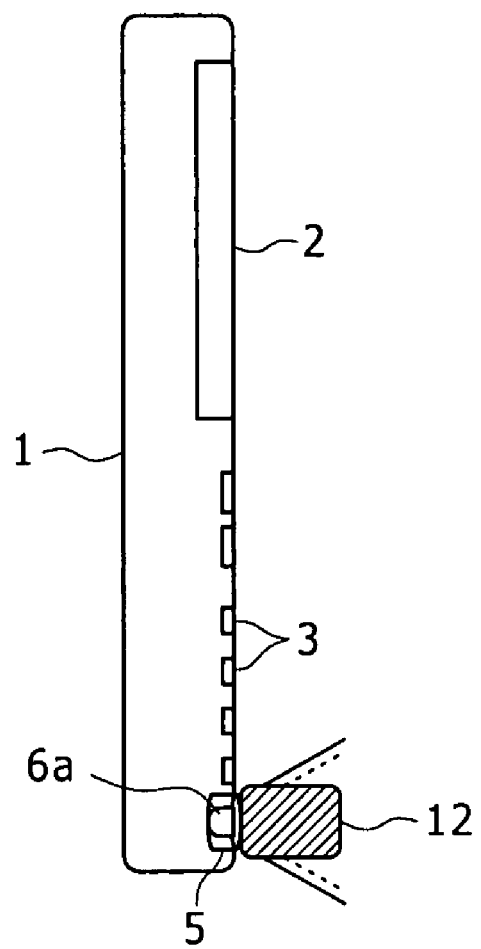
FIG. 26 is a schematic left side view of a layout configuration of the 15th practical example of the mobile phone terminal in accordance with the embodiment of the present invention.
Figure 27:
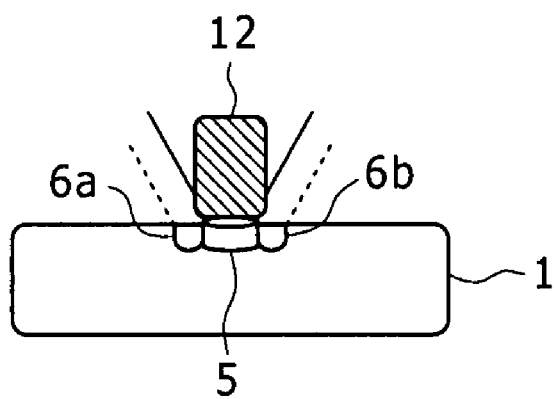
FIG. 27 is a schematic bottom view of a layout configuration of the 15th practical example of the mobile phone terminal in accordance with the embodiment of the present invention.

FIGS. 25 to 27 shows a layout configuration of the camera section 5 and light sections 6a and 6b disposed to a housing unit of a 15th practical example of a straight camera-enabled mobile phone terminal 1 having the vein authentication function. FIG. 25 is a view of the straight mobile phone terminal 1 as viewed from the first major surface side. FIG. 26 is a view of the mobile phone terminal 1 of FIG. 25, as viewed from the left lateral side. FIG. 27 is a view of the mobile phone terminal 1 of FIG. 25, as viewed from the lower face side.

In the layout configuration of the 15th practical example shown in FIGS. 25 to 27, the camera section 5 and the light sections 6a and 6b are provided in a terminal's end portion in the vicinity of the keyboard section 3 on the first major surface side.

The camera section 5 is provided is disposed such that the optical axis of the imaging optical system is substantially perpendicular to the first major surface.

The light sections 6a and 6b are disposed in such a manner as to sandwich the camera section 5 from two sides and in the manner that the respective optical axes of the illumination optical systems thereof are substantially perpendicular to the first major surface.

The mobile phone terminal 1 is thus formed into the layout configuration of the 15th practical example shown in FIGS. 25 to 27. With the use of the mobile phone terminal 1, when close-up photography for biometric authentication is performed, a photographic subject 12 or capture object (biological portion) is placed in contact with the first major surface, as shown in FIGS. 26 and 27. Concurrently, the photographic subject 12 to cover the camera section 5, and to partly cover the respective illumination light emanation portions of the light sections 6a and 6b.

Figure 28:
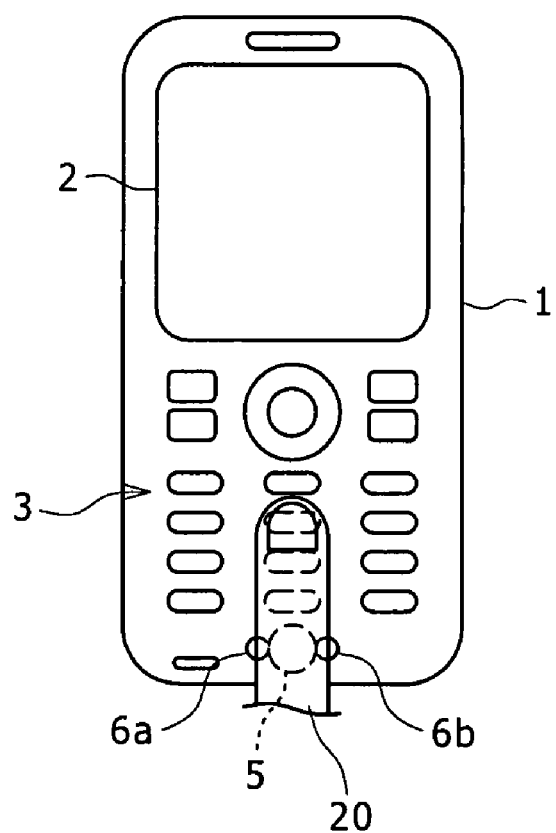
FIG. 28 is an explanatory schematic front view of a layout configuration of the 15th practical example of the mobile phone terminal in a sixth utilization example in accordance with the embodiment of the present invention.
Figure 29:
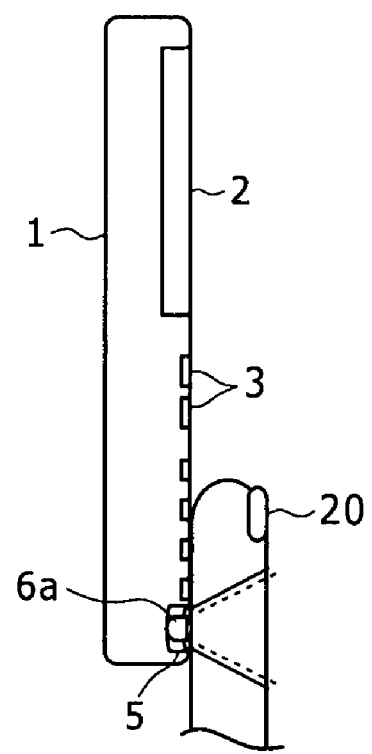
FIG. 29 is an explanatory schematic left side view of a layout configuration of the 15th practical example of the mobile phone terminal in the sixth utilization example in accordance with the embodiment of the present invention.
Figure 30:
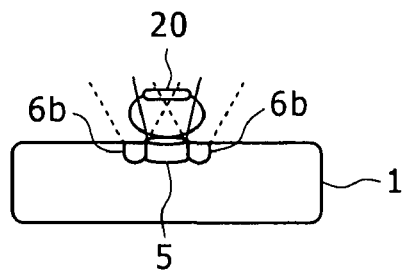
FIG. 30 is an explanatory schematic bottom view of a layout configuration of the 15th practical example of the mobile phone terminal in the sixth utilization example in accordance with the embodiment of the present invention.

Referring to FIGS. 28 to 30, the following describes a practical utilization example (sixth utilization example) in the case of performing, for example, finger vein authentication with the use of the mobile phone terminal 1 having the layout configuration of the 15th practical example. FIG. 28 is a view of the straight mobile phone terminal 1 as viewed from the first major surface side. FIG. 29 is a view of the mobile phone terminal 1 of FIG. 28, as viewed from the left lateral side. FIG. 30 is a view of the mobile phone terminal 1 of FIG. 28, as viewed from the lower face side.

In finger vein authentication with the use of the mobile phone terminal 1, any one finger 20 of a user's hand is placed in contact with the first major surface and in such a manner as to cover the camera section 5 and partly to cover the light sections 6a and 6b.

According to the utilization example of the mobile phone terminal 1, since the finger 20 is place in close proximity to (in contact with) the housing, the positional relationship between the housing and the finger 20 can easily be established. Further, according to the present utilization example, since the finger 20 can be steadily placed, also illumination onto the finger 20 is situated in an optimal position. Thereby, the relative positional relationship between the photographic subject and the illumination is relatively steady, and, for example, the brightness of the illumination and various setting parameters of the camera section 5 can be relatively easily determined.

Further, according to the present utilization example, the finger 20 is placed in contact with the first major surface of the terminal 1 and in such a manner as to cover the camera section 5 side of the illumination light emanation portions of the light sections 6a and 6b. Consequently, a good vain image can be captured or acquired by the camera section 5. More specifically, in the present embodiment, substantially the entire face of the camera section 5 is cover by the finger 20, such that the influence of outer light such as sunlight, for example, is reduced.

[General Interior Configuration of Mobile Phone Terminal 1]

Figure 31:
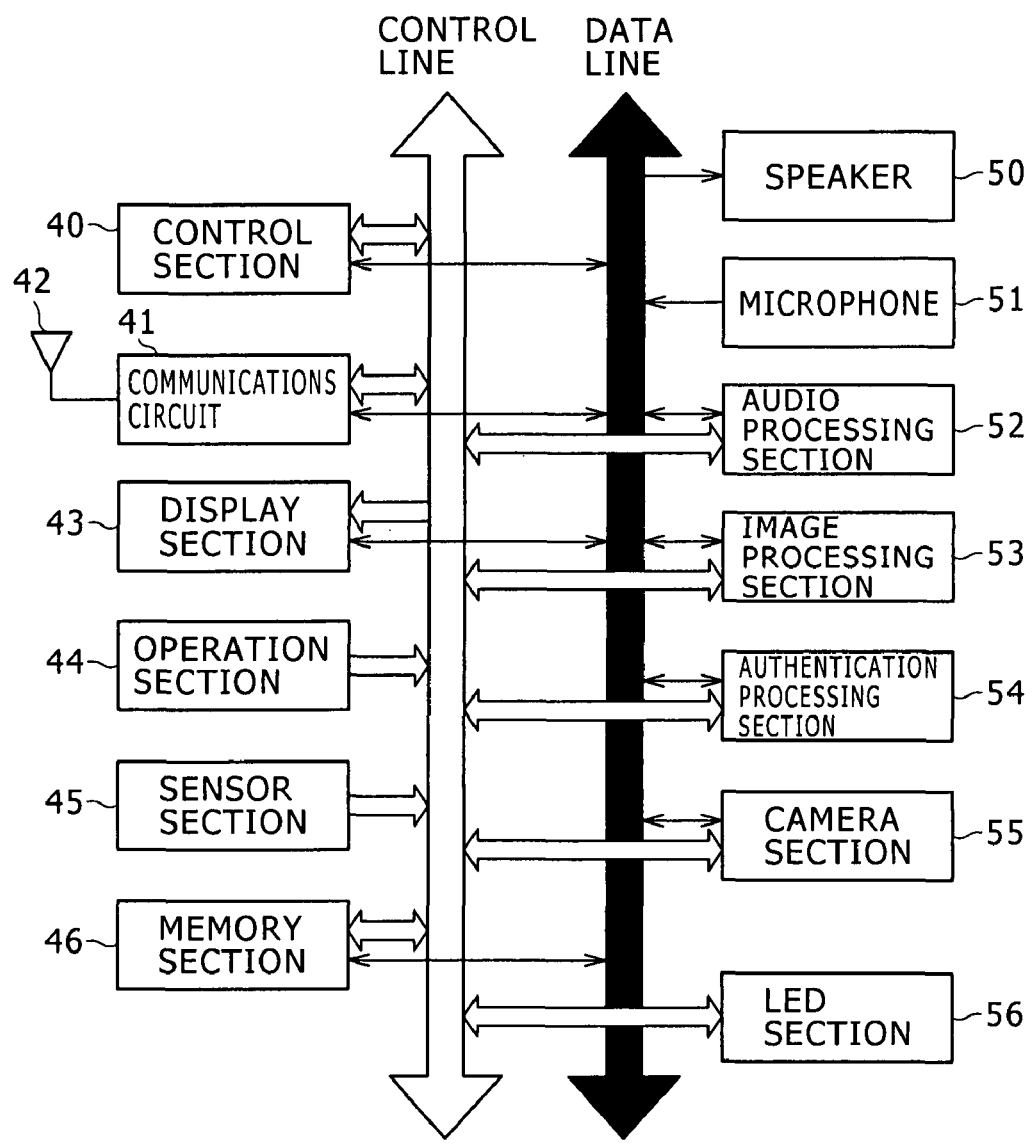
FIG. 31 is a block diagram showing a general interior configuration of the mobile phone terminal in accordance with the embodiment of the present invention.

FIG. 31 shows a general interior configuration of the above-described mobile phone terminal 1 in accordance with the embodiment of the present invention.

A communication antenna 42 is a built-in antenna, and performs transmission and reception (communication) of radio signals for, for example, telephone communication and packet communication. A communication circuit 41 performs, for example, frequency conversion, modulation, and demodulation of communication signals. Data to be communicated via packet communications are various types of data, such as electronic mail data, image data of motion and still images and the like, audio data, HTML (Hyper Text Markup Language) data, and program data. When data received at the communication antenna 42 and the communications circuit 41 is communication audio data, the telephone communication is transferred to an audio processing section 52 through a data line. Other received data is once transferred to a control section 40 and is processed therein, and the data is then transferred by necessity to a respective section from the control section 40.

Upon receipt of the received data of communication audio from the communication antenna 42, the audio processing section 52 decodes the received data of the communication audio and transfers the decoded communication audio data to a speaker 50 through the data line.

The speaker 50 is of the type provided in the mobile phone terminal, such as a receiving speaker, or a speaker for a ringer sound (incoming sound), music replaying, and alarm sound outputting. The speaker 50 includes a digital/analog convertor and an amplifier, in which data of, for example, communication audio, ringer sound, or replay music is output after being digital/analog converted and amplified. Thereby, the communication audio, ringer sound, replay music, or the like can be acquired.

A microphone 51 is a transmission microphone and includes an analog/digital convertor and an amplifier. A communication audio signal input through the microphone 51 is amplified by the amplifier to a predetermined level and then is converted by the analog/digital convertor to digital audio data. The data is then transferred to the audio processing section 52 and is coded thereby, then is transferred to the communication circuit 41 through the data line, then undergoes various processes, such as modulation and frequency conversion, and then is transmitted from the communication antenna 42.

A display section 43 includes the display section 2, which is formed from, for example, liquid crystal, and a display drive circuit. The display drive circuit drives the display section 2 in accordance with an image signal supplied from an image processing section 53. Thereby, displays, such as images and characters, are displayed on the display section 2.

A camera section 55 is formed from, for example, a camera dedicated for the close-up photography and biometric authentication or a regular camera.

A LED (light emitting device) section 56 includes, for example, an incoming call LED, an auxiliary light LED for camera's imaging operation, a backlighting LED for the display section 43, illuminating LEDs for respective keys, and the light section 6 dedicated for the close-up photography and biometric authentication.

The image processing section 53 performs processes of images for displaying them on the display section 43. In addition, the image processing section 53 performs decompression coding of data and transmits the data through the data line to the display section 43 for displaying thereon under the control of the control section 40. The data to be handled in this case are, for example, compression coded image data read from a built-in memory or image data acquired through the Internet. Further, the image processing section 53 performs, for example, compression coding of data such as still image or motion image data captured by the camera section 55, and transmits the compression coded image data by necessity to the built-in memory for storage therein under the control of the control section 40.

An operation section 44 includes operation devices and an operation signal generator. The operation devices include, for example, the keyboard section 3 provided to the housing unit of the mobile phone terminal 1. The operation signal generator generates operation signal in response to the operations of the respective operation devices.

An authentication processing section 54 performs user authentication in the following manner when the mobile phone terminal 1 is set to a biometric authentication mode. A user-specific biological pattern, such as a vein or fingerprint, is extracted from biometric-photography image information captured in the camera section 55 and subjected to an appropriate image process in the image processing section 53, and a comparison is made between the extracted biological pattern and a biological pattern of a legal user preliminarily registered in a memory section 46, thereby to perform the user authentication. Information of the authentication result is transferred to the control section 40.

A sensor section 45 is a sensor, such as a pressure sensor, electrostatic capacitance sensor, or photo-reflection detection sensor, that is capable of detecting the presence or absence of, for example, a user's finger. The sensor section 45 is disposed in the vicinity of the light section 6. For performing biometric authentication, the mobile phone terminal 1 of the present embodiment commences a biometric authentication process when the sensor section 45 has detected the existence of a biological organism of a finger or the like. More specifically, for example, as in the above-described utilization example, the finger existence in the predetermined position is detectable in conjunction with finger placement, and the biometric authentication process is commenced in response to the detection.

The memory section 46 includes a ROM (read-only memory) and a RAM (random access memory). The ROM preliminary stores, for example, an OS (operating system); control program codes for the control section 40 to control the respective sections; various initial set values; font data; dictionary data to be used for kana-kanji conversion and prediction conversion, for example; sound data such as ringer sounds and operation sounds; control program codes of the biometric authentication in accordance with the present embodiment; program codes for various applications installed in the terminal 1; and equipment identification (ID) information. The ROM includes a rewritable ROM, such as a NAND-type flash memory or EEPROM (electrically erasable programmable read-only memory), thereby being capable of storing various types of data and information. The data and information are, for example, electronic mail data, telephone directory and electronic mail address book data, scheduler data, communication log data, user dictionary data, still and motion image data, legal-user registration biological pattern information to be used for biometric authentication in accordance with the present embodiment, and various user setting values. The RAM provides work area for storing data at any time when the control section 40 performs various data processes.

The control section 40 includes a CPU (central processing unit), and performs various control operations in the terminal 1 in such the event of biometric authentication.

Although not shown, similarly as general mobile phone terminals, the mobile phone terminal 1 shown in FIG. 31 includes other components and functions, such as an external memory interface, external cable connector, infrared communication function, electronic wallet function, vibrator, battery, and current control function. Descriptions of circuit and other configurations included in general mobile phone terminals are omitted herefrom.

CONCLUSION

A mobile phone terminal 1 of the present embodiment includes a light section 6 and a camera section 5. The light section 6 is provided to illuminate a photographic subject disposed in contact with a predetermined position of a surface of a housing. The camera section 5 is provided in a position apart from the disposition position of the light section 6 and in the manner that the optical axis of an imaging optical system of the camera section 5 is directed to the vicinity upward of the disposition position of the light section 6. The light section 6 is disposed in the manner that at least a part thereof on the side where the camera section 5 is disposed is covered by a photographic subject when the photographic subject is placed in a photographic subject placing section. Consequently, no cases take place in which direct light from the light section 6 or reflected light from the surface of the photographic subject enters into the camera section 5.

Further, according to the mobile phone terminal 1 of the present embodiment, in the image capture event, the photographic subject is placed in a predetermined position of the housing surface, in which the relative position between the camera section 5 and the photographic subject is steady. In addition, also the light section 6 is laid out in an optimal position, such that the relative position between the photographic subject and the illumination is relatively steady. Consequently, for example, the brightness (intensity of illumination) and various setting parameters can be relatively easily determined.

Further, according to the mobile phone terminal 1 of the present embodiment, close-up photography can be performed to produce a good photographic image in terms of the photographic subject size and position within the image and the illumination brightness, without defects resulted from, for example, variation of the distance from the camera section 5 or the light section 6 to the photographic subject, motion blur and photographic subject blur.

Further, according to the present embodiment, the position of the photographic subject in the image capture event is always fixed to substantially the same position. Consequently, even when, for example, plural times of imaging operations are performed with time interval, each photographic subject can be easily placed in substantially the same position as in the previous time, such that an image with a similar composition can be acquired at each time.

Further, according to the mobile phone terminal 1 of the present embodiment, when performing close-up photography, the photographic subject and the camera section can be spaced apart at a certain distance. Consequently, image distortion prone to occur in close-up photography can be reduced.

Further, according to the mobile phone terminal 1 of the present embodiment, a good photographic image can be acquired in the close-up photography. As such, the specification levels required for the resolution of the camera section 5, the optical systems, and control system can be reduced to certain degrees. Thereby, design can be relatively easily carried out, and, for example, efficient parts selection and control can be carried out, such that the costs for design, parts, and manufacture can be significantly reduced.

Further, according to the present embodiment, in performing authentication, especially, vein authentication, accurate position reproduction of a specific biological portion to be imaged can be performed. Consequently, authentication and registration of a specific user can be accurately, speedily, and easily performed in accordance with vein photographic information of the specific biological portion. Further, in the biometric authentication process and an application thereof, adjustment processes and the like processes for various setting factors can be reduced. Accordingly, the design man-hours and the program sizes can be reduced, and the processing speeds and the process accuracy can be enhanced, consequently making it possible to improve usability for users.

Further, according to the present embodiment, as in the first to fifth utilization examples, in the case where, in the event of finger vein authentication, two fingers clamp the housing of the terminal 1 therebetween so that the base of the fingers abuts on the terminal's lateral surface, substantially no gap exists between the respective finger and the housing surface. As such, respective deviations in the height and transverse directions when the fingers are placed can be naturally and simultaneously prevented. Further, since the housing of the terminal 1 is clamped between two fingers, the distance between the two fingers is minimized, thereby reducing deviations of the fingers in the rotation direction can be reduced. Thus, according to the mobile phone terminal 1 of the present embodiment, transverse, height, and rotational deviations of the fingers can be suppressed. With synergistic effects of these advantages, the reproducibility of the finger position can be comprehensively improved, such that the photographic portion of the finger can be set every time to substantially the same portion, thereby making it possible to acquire a good photographic image. As such, authentication errors resulted from image quality deterioration of photographic images can be reduced. Whatever the finger may be the finger of the right or left hands, the dependency of the authentication accuracy is low over the right or left hand, such that the authentication can be performed for a finger of any of the hands. Consequently, a user does not have to be skilled in finger positioning for the biometric authentication. This makes it possible to the position reproduction in the biometric authentication event to be carried out through easy, simple operations. As such, the biometric authentication can be performed even by, for example, a novice user who carries out the authentication operation for the first time, a user who seldom carries out the authentication operation, or a user who has a biometrical portion significantly differs in size and shape from a biometrical portion contemplated in the design stage. Further, according to the present embodiment, since the portion to be imaged by the light section 6 is a body portion of the finger, such that even more accurate vein authentication can be performed.

Further, according to the present embodiment, in the practical examples of the layout in which, for example, the camera section 5 is provided on the second major surface side (back surface side) of the housing, the construction is formed to be less influenced by outer light, such as sun light. On the other hand, in the practical example in which the camera section 5 is provided on the first major surface side of the housing, the user can relatively easily compare the position in which the finger is placed and a corresponding image displayed on the display section 2, thereby making it possible to offer high usability.

Further, according to the present embodiment, the camera section 5 and the light section 6, respectively, can be disposed in variable sites, such that mounting conditions and design constraints are relatively small.

The embodiment and various examples described above are just examples for describing the present invention. The present invention therefore should not be interpreted as being limited to those embodiments and examples, but can be modified in various ways depending on the design without departing from the technical concept or spirit of the present invention.

The present invention is not limited to the mobile phone terminals described in the embodiment, but can be adapted to various types of mobile terminals, such as PDAs (personal digital assistant), car navigation systems, and remote controllers for AV devices.

Further, the illumination light to be emanated from the light section 6 can be in the form of not only continuous emission, but also pulse emission. With the pulse emission, when pulse emission timing and imaging timing for biometric authentication are synchronized, the outer light influence in the biometric authentication can be reduced.

It should be understood by those skilled in the art that various modifications, combinations, sub-combinations and alterations may occur depending on design requirements and other factors insofar as they are within the scope of the appended claims or the equivalents thereof.

What is claimed is:

1. An image capture apparatus comprising:
an illumination section for illuminating a photographic subject placed in contact with a predetermined position of a housing surface;
an imaging section for imaging the photographic subject placed in contact with the predetermined position of the housing surface, the imaging section being disposed in a portion apart from a disposition position of the illumination section; and
a photographic subject placing section constituting a part of the housing surface and disposed in the vicinity of the illumination section, wherein a part of a light emanation portion of the illumination section is covered by the photographic subject when the photographic subject is placed in contact with the predetermined position,
and wherein the imaging section disposed in a portion apart from a disposition position of the illumination section is configured for imaging of the photographic subject along an optical axis that is external to the housing surface.

2. The image capture apparatus according to claim 1, wherein the photographic subject placing section is disposed in the vicinity of the illumination section in a manner that at least a part of the light emanation portion of the illumination section on a side where the imaging section is disposed is covered by the photographic subject when the photographic subject is placed in contact with the predetermined position.

3. The image capture apparatus according to claim 1, wherein the imaging section is provided in a manner that the optical axis of an imaging optical system is directed to the vicinity upward of the disposition position of the illumination section.

4. The image capture apparatus according to claim 3, wherein the imaging section is provided either on the housing surface on which the illumination section is provided or on a housing face existing along substantially the same line as the housing surface on which the illumination section is provided.

5. The image capture apparatus according to claim 3, wherein the imaging section is provided either to a housing face or to a member, the housing surface including a stepped portion with respect to the housing surface on which the illumination section is provided.

6. The image capture apparatus according to claim 1, wherein the light emanation portion of the illumination section is in the shape of a rectangle having long sides situated along a direction substantially perpendicular to an optical axis direction of an imaging optical system of the imaging section.

7. A biometric authentication apparatus comprising:
an illumination section for irradiating at least near infrared light onto a biological portion placed in contact with a predetermined position of a housing surface;
an imaging section for imaging at least a near infrared light image incoming from the biological portion placed in contact with the predetermined position of the housing surface, the imaging section being provided in the vicinity of the illumination section;
a photographic subject placing section constituting a part of the housing surface and disposed in the vicinity of the illumination section, wherein at least a part of the light emanation portion of the illumination section on a side where the imaging section is disposed is covered by the photographic subject when the photographic subject is placed in contact with the predetermined position; and
an authentication section for performing biometric authentication by making a comparison between a specific pattern extracted from the near infrared light image of the biological portion imaged by the imaging section and a preliminarily registered specific pattern,
and wherein the imaging section provided in the vicinity of the illumination section is configured for the irradiating of the at least near infrared light onto the biological portion and the imaging of the near infrared light image along an optical axis that is external to the housing surface.

8. The biometric authentication apparatus according to claim 7, wherein the imaging section is provided in a manner that the optical axis of an imaging optical system is directed to the vicinity upward of the disposition position of the illumination section.

9. The biometric authentication apparatus according to claim 8, wherein the imaging section is provided either on the housing surface on which the illumination section is provided or on a housing face existing along substantially the same line as the housing surface on which the illumination section is provided.

10. The biometric authentication apparatus according to claim 8, wherein the imaging section is provided either to a housing face or to a member, the housing surface including a stepped portion with respect to the housing surface on which the illumination section is provided.

11. The biometric authentication apparatus according to claim 1, wherein the light emanation portion of the illumination section is in the shape of a rectangle having long sides situated along a direction substantially perpendicular to the optical axis direction of an imaging optical system of the imaging section.

* * * * *